(12) United States Patent
Stemle

(10) Patent No.: US 10,369,445 B2
(45) Date of Patent: Aug. 6, 2019

(54) VIDEO ANALYTICS FOR HUMAN PERFORMANCE

(71) Applicant: Stephen Joseph Stemle, New Albany, IN (US)

(72) Inventor: Stephen Joseph Stemle, New Albany, IN (US)

( * ) Notice: Subject to any disclaimer, the term of this patent is extended or adjusted under 35 U.S.C. 154(b) by 28 days.

(21) Appl. No.: 15/674,505

(22) Filed: Aug. 10, 2017

(65) Prior Publication Data

US 2018/0043229 A1    Feb. 15, 2018

Related U.S. Application Data

(60) Provisional application No. 62/373,334, filed on Aug. 10, 2016.

(51) Int. Cl.
| | |
|---|---|
| *A63F 9/00* | (2006.01) |
| *A63B 69/00* | (2006.01) |
| *A63B 24/00* | (2006.01) |
| *A63B 71/06* | (2006.01) |
| *G06T 7/11* | (2017.01) |
| *G06T 7/20* | (2017.01) |
| *G06T 7/70* | (2017.01) |

(52) U.S. Cl.
CPC ...... *A63B 69/0002* (2013.01); *A63B 24/0006* (2013.01); *A63B 24/0021* (2013.01); *A63B 71/0622* (2013.01); *G06T 7/11* (2017.01); *G06T 7/20* (2013.01); *G06T 7/70* (2017.01); *A63B 2024/0012* (2013.01); *A63B 2024/0034* (2013.01); *A63B 2024/0056* (2013.01); *A63B 2069/0006* (2013.01); *A63B 2071/0625* (2013.01); *A63B 2071/0655* (2013.01); *A63B 2220/806* (2013.01); *A63B 2225/50* (2013.01); *G06T 2207/30224* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 4,545,576 A | 9/1985 | Harris | |
| 7,341,530 B2 | 3/2008 | Cavallaro et al. | |
| 7,946,960 B2 | 5/2011 | Vitoio | |
| 8,142,267 B2 * | 3/2012 | Adams | A63B 24/0006 463/2 |
| 8,876,638 B2 | 11/2014 | Paul | |
| 8,908,922 B2 | 12/2014 | Marty | |
| 9,275,470 B1 * | 3/2016 | Forkosh | G06T 11/60 |
| 2008/0086223 A1 | 4/2008 | Pagliarulo | |
| 2010/0041498 A1 * | 2/2010 | Adams | A63B 24/0006 473/451 |
| 2011/0190912 A1 | 8/2011 | Paul et al. | |

(Continued)

FOREIGN PATENT DOCUMENTS

WO    WO2001054781    10/2001

*Primary Examiner* — Seng Heng Lim
(74) *Attorney, Agent, or Firm* — The Compton Law Firm. P.C.; Scott D. Compton

(57) ABSTRACT

The present application is directed to a system and method providing vision algorithms for identifying objects traveling in space and identifying the configuration of one or more targets of the objects. The system is suitably programmed to record data related to movement of objects in relation to one or more targets.

16 Claims, 20 Drawing Sheets

(56) References Cited

U.S. PATENT DOCUMENTS

2011/0250936 A1   10/2011  Christenson
2013/0310958 A1   11/2013  Sanchez
2017/0333777 A1*  11/2017  Spivak ............... A63B 71/0605

* cited by examiner

VIDEO ANALYTICS FOR HUMAN PERFORMANCE

CROSS-REFERENCE TO RELATED APPLICATIONS

This application claims the benefit of U.S. provisional patent application Ser. No. 62/373,334, filed on Aug. 10, 2016.

STATEMENT REGARDING FEDERALLY SPONSORED RESEARCH OR DEVELOPMENT

Not applicable.

FIELD OF THE APPLICATION

The application relates generally to training and analyzing sports related throwing activities.

BACKGROUND OF THE APPLICATION

The training and development of a baseball pitcher often focuses on methods of improving throwing mechanics and throwing velocity while preventing or minimizing injury. However, traits related to pitch location, the movement on a pitched baseball and pitch selection from pitch to pitch for individuals are often neglected and not included as part of training and development. While good velocity on a pitched baseball may help a pitcher get away with location mistakes in and around the strike zone, the combination of pitch location, pitch selection, changing the speed of the baseball from pitch to pitch and the movement placed on the baseball from pitch to pitch is desired for long term pitching success—especially at higher levels of competition.

As is commonplace in athletics, individuals frequently offer differing philosophies as to how pitchers should best approach the art of pitching, i.e., how to best pitch to particular batters and how to manage the strike zone via pitch location, pitch selection and movement on the baseball. An approach is desired that addresses Applicant's own individual philosophy regarding baseball pitching and targeted throwing generally.

SUMMARY OF THE APPLICATION

The present application is directed to a system, including (1) one or more targets each target having an outlay of distinct zones; (2) one or more objects to be directed toward one or more targets; and (3) a computer vision system operationally configured to receive input providing the outlay of one or more particular targets; receive input providing one or more locations on one or more of the particular targets intended to be contacted by one or more objects; receive input providing motion information for one or more objects directed toward one or more targets; receive input providing the location that each of the one or more objects contacts a particular target; compute said received input to provide information related to accuracy, object velocity, object travel path, object vertical displacement, and combinations thereof.

The present application is also directed to a system and method including a computer visions system operationally configured to provide automated pitching data useable with one or more predetermined physical target configurations and/or virtual target configurations.

The present application is also directed to a system and method including a computer vision system and one or more throwing targets each having an outlay of one or more distinct colored zones. In order to identify the location that a thrown object contacts a particular throwing target, the system and method suitably employ vision algorithms to cluster the different pixels of one or more target zones according to the color distributions of the target zones.

DETAILED DESCRIPTION

Figure 1:
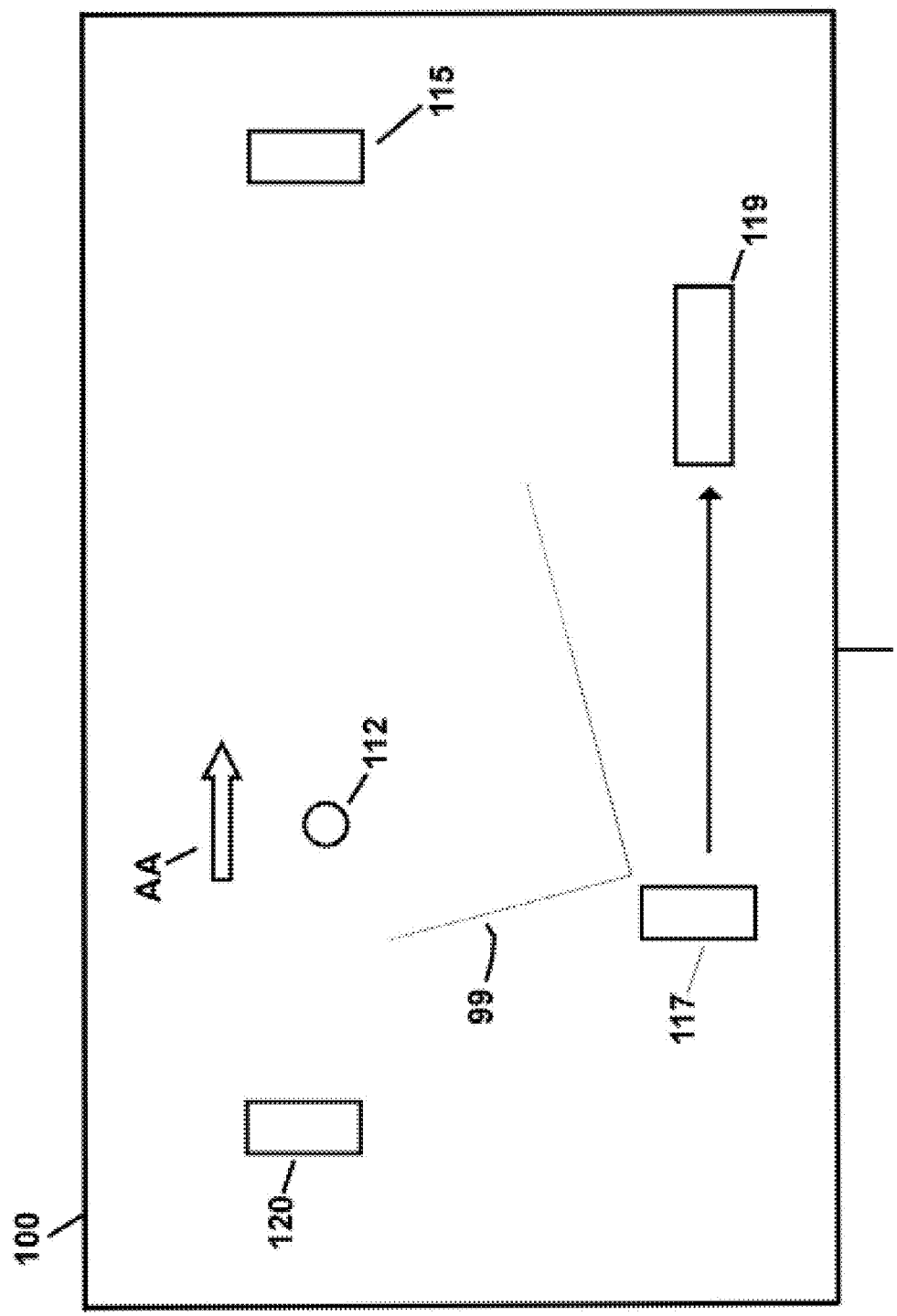
FIG. 1 is a simplified illustration of an embodiment of the system of the present application.

In baseball pitching, knowing when to throw, how hard to throw and where to locate a particular pitch, successive pitches or a series of pitches is vital for getting batters out on a consistent basis. Depending on the pitch count for a particular batter, if a pitcher does not vary the velocity, movement and location of his/her pitches, a particular batter or the opposing team may better anticipate a particular type of pitch having a certain velocity in a particular location during a particular at-bat or series of at-bats. Since baseball batters rely heavily on their own timing and/or rhythm when hitting, a batter may better contact or hit a pitched ball when facing a pitcher that does not vary the velocity, movement and location of pitches effectively. Thus, it is desirable for pitchers to develop those skills that best disrupt a batter's timing and/or rhythm. The present application provide pitchers a system and method for developing, analyzing and recording pitch selection, velocity, movement and location accuracy according to Applicant's own philosophy regarding baseball pitching. Heretofore, such a desirable achievement has not been considered possible, and accordingly, the teaching of this application measure up to the dignity of patentability and therefore represents a patentable concept.

Before describing the invention in detail, it is to be understood that the present invention is not limited to particular embodiments. It is also to be understood that the terminology used herein is for the purpose of describing particular embodiments only and is not intended to be limiting. As used in this specification and the appended claims, the terms "thrower" and "pitcher" may be used interchangeably to refer to an individual throwing, casting, projecting, or propelling a ball or other object toward a target or "throwing target." A "target" or "throwing target" may include a target surface for aiming one or more objects. One suitable target for baseball may include an array of distinct zones or regions thereon, which may be referred to herein as a "target configuration" or "target outlay." The terms "train," "training" and like terms refer to the instruction, development, analytics and/or education of an individual or individuals as related to the act of throwing. The terms "develop," "developing" and like terms may be used interchangeably with "training," "train" and the like. The term "ball" means a spherical projectile including, but not necessarily limited to a conventional baseball having seams and laces or a conventional softball having seams and laces. Because this application is not limited to baseball, other types of activities may employ the technology of this application. For example, other sport activities employing balls or propelled objects are herein contemplated, e.g., soccer, American football, tennis, table tennis, racquetball, hand ball, water polo, javelin thrown, hammer throw, discuss throw, shot put, field hockey, ice hockey, basketball, darts, firearm shooting, archery, lacrosse, bowling, badminton, volleyball, beach volleyball, golf, rugby, Australian Rules Football, cricket, frisbee and horse shoes.

Herein, to "throw" means to propel a ball or other object from the throwing hand of an individual so as to be airborne. A "session" may refer to any one particular period of system and/or method use by a particular individual. For example, a game outing for a pitcher may be considered a single session. A particular practice outing may be referred to as a single session or practice session as commonly referred to in the art of baseball. The phrase "pitching sequence" refers to any number of pitches delivered by a pitcher during a practice session and/or a single at bat for a particular batter in a game type setting. The terms "movement" and "movement on the ball" and like phrases refer to the directional movement of the baseball in space from the point of release out from a pitcher's hand toward a throwing target or catcher a desired distance. The term "velocity" refers to the traveling speed of a pitched baseball. In baseball terms, the phrase "intended location" or "intended pitch location" refers to the desired location in space of a particular pitched baseball as the baseball travels through or outside of a predetermined strike zone and/or home plate. The phrase "location," "pitch location," "actual pitch location" and like phrases refers to the definite location of a pitched baseball in space as the baseball travels through or outside of a predetermined strike zone and/or home plate. The terms "control" and "situational control" refer to a pitcher being able to throw a baseball to a specific location in space as desired. In regard to activities other than baseball, phrases such as "aiming point," "aiming location" and the like may be employed to reference a desired location for propelling a particular object through space.

The game of "baseball" may refer to either baseball or softball, i.e., competitive fast pitch softball. The phrase "home base" includes the commonly used phrases "home plate" or simply the "plate." The phrase "strike zone" refers to a volume of space over a home plate through which a baseball must travel to count as a strike. As understood by persons familiar with the rules of Major League Baseball, the top of the strike zone is defined as a horizontal line at the midpoint between the top of the batter's shoulders and the top of the uniform pants. The bottom of the strike zone is a line at the hollow beneath the kneecap, both determined from a batter's stance as the batter is prepared to swing at the pitched ball. The right and left boundaries of the strike zone correspond to the edges of home plate.

The phrase "situational pitching" and like terms refers to game type situations and the pitches thrown in response to a given game type situation. Herein, the term "infielder" refers to one or more of the following position players: pitcher, catcher, first base, second base, third base, and shortstop. With reference to pitching, the phrase "pitch count" refers to the total number of pitches thrown by a particular pitcher during a game or practice session. The phrase "batter's count" and "count" refer to the number of balls and strikes a batter has in a particular plate appearance or at-bat as the terms are known by those of ordinary skill in the game of baseball. For example, when a batter first steps into the batter's box for a particular plate appearance, the batter's count starts at 0-0. The phrase "ahead in the count" refers to a pitcher possessing the advantage in an at-bat, i.e., when a pitcher has thrown more strikes than balls to a particular batter during a particular at-bat. When a batter is "ahead in the count," there are more balls than strikes during a particular at-bat. The phrase "protecting home plate," and like phrases, refer to a batter attempting to avoid a called third strike by swinging at a pitched baseball. The phrases "pitching a strike," "throwing a strike," "strike" and like phrases, refer to a pitcher locating a pitched baseball within the designated strike zone according to the rules of the game of baseball, e.g., the rules of Major League Baseball as of the date of this application.

The phrase "Righty" may refer to either a right handed throwing pitcher or a right handed hitting batter as understood by those of ordinary skill in the game of baseball. Likewise, the phrase "Lefty" may refer to either a left handed throwing pitcher or a left handed hitting batter. The phrase "muscle memory" refers to the process by which an individual's neuromuscular system memorizes motor skills, such as those motor skills related to Applicant's own philosophy regarding the proper approach to pitching. The term "fastball" refers to a type of pitch typically thrown with backspin, so that the "Magnus Effect," i.e., the force perpendicular to the forward motion on a spinning object moving through a fluid or gas, as that responsible for the curve on a curve ball, creates an upward force on the ball, causing it to fall less rapidly than might be expected. The fastball is typically a pitcher's highest velocity pitch. The phrase "off-speed pitch" refers to types of pitches other than fastballs. The term "change-up" refers generally to an off-speed pitch thrown with the same arm action as a fastball, but at a lower velocity. The phrase "breaking ball" refers generally to off-speed pitches other than the change-up pitch as the term is typically known in the game of baseball and may be thrown with the same arm action as the fastball. The phrase "delivering a pitch" means throwing a baseball toward a throwing target or toward a catcher during a game or game simulation type situation. Historically, in the game of baseball the phrase "charting pitches" and like phrases has referred to the recordation of pitch location and/or pitch type and/or pitch velocity for individual pitches thrown in practice and/or game situations by individual pitchers. For purposes of this application, the phrase "charting pitches" and like phrases may further refer to the recordation of the (1) intended and realized pitch location and/or (2) intended pitch type and/or (3) intended and realized pitch velocity and/or (4) intended and realized vertical displacement for individual pitches to a throwing target or hind catcher.

The phrase "irregular shape" refers to a zone of the throwing target having an outer border in a shape other than spherical, rectangular, and regular polygons. The term "batter" refers to the offensive player who takes position in the batter's box to face a pitcher. As understood by those of ordinary skill in the game of baseball, a batter may also be referred to as a "hitter." The phrase "hitting motion" and "batting motion" may refer to the physical action of an individual from the moment he/she begins a hitting motion through the end of the swing part of the hitting motion. As understood by the skilled artisan, a baseball hitter typically begins the hitting motion by "loading the hands," "triggering the hands" or "cocking the hands" as such phrases are understood in the art—alone, or in combination with a weight shift toward the back leg thereby loading on the back leg or "coiling" as understood by persons of ordinary skill in the art. The term "ground" may refer to a sports playing surface or practice surface, a floor or other support surface of the system 100 described herein.

In one aspect, the application is directed to a system and method providing vision algorithms for identifying a throwing target configuration and aiming pitches at one or more individual zones of the throwing target to collect pitching data including, but not necessarily limited to the intended pitch location of individual pitches, actual pitch location realized for individual pitches, the velocity of individual pitches, the vertical displacement of individual pitches, and combinations thereof, in a manner effective to (1) provide information in regard to accuracy and/or precision, (2) develop pitching accuracy, often referred to as "control," (3) develop pitching precision, often referred to as "command," (4) develop one or more types of pitches thrown by an individual pitcher and (5) optimize pitch location and pitch type for a series of pitches. As understood by persons of ordinary skill in the art of target aiming, the term "accuracy" generally refers to how close measurements are to a true value or intended location of a particular pitch. The term "precision" generally refers to how close measurements are to each other. Pitching data related thereto may be electronically recorded and stored for future use. By knowing or inputting into the present system a particular throwing target configuration or layout, the intended pitch location and/or the type of pitch being thrown for individual pitches, the pitch location actually realized for each pitch may be recorded and compared to the intended location providing real time information regarding pitch control. The accumulation of recorded pitch locations realized may be used to provide information regarding pitch command or accuracy type information. Suitably, performance data for individuals may be recorded and analyzed to construct future pitch types and/or pitch locations for individual pitchers generally and/or in regard to one or more anticipated opponent hitters.

In another aspect, the application provides a system and method for third party observation of pitching activities from a remote location in real time via live video recording and/or at a later time or date via stored video recording.

In another aspect, the application provides a system and method of collecting and storing pitching data in regard to a predetermined throwing target configuration, intended pitch location and actual pitch location, the velocity of individual pitches, the vertical displacement of individual pitches, and combinations thereof. Suitably, the stored data is retrievable electronically by one or more persons at one or more remote locations.

In another aspect, the application provides vision algorithms operationally configured to detect or identify a particular target or target outlay comprising a plurality of throwing target zones or distinct locations amongst a plurality of known target outlays in order to accumulate contact location data of objects contacting the identified target. In baseball terms, vision algorithms may be employed to detect or identify a target or target outlay including a plurality of throwing target zones or distinct locations to accumulate contact location data of objects based on the intended pitch location of one or more pitches and the actual pitch location of each pitch performed, the velocity of individual pitches, the vertical displacement of individual pitches, and combinations thereof.

In another aspect, the application provides vision algorithms to identify one or more independent target regions in space of one or more known throwing targets absent use of an actual physical throwing target. In other words, the present system is programmed to identify one or more particular visual or phantom target outlays for identifying the location of pitched baseballs delivered to a hind catcher.

In another aspect, the application provides a system and method for identifying one or more distinct target zones of a particular virtual target outlay in space amongst a plurality of throwing target outlays using a template matching algorithm, extracting an image of the identified throwing target outlay and saving it as a throwing target template for use by one or more individuals for mapping the location of individual pitches in relation to the target zones. The present system and method is further operationally configured to change from a first virtual target outlay to a second virtual target outlay for a particular individual during a particular session and/or during a different session. As such, the present system and method are effective to produce information regarding individual pitchers performance and/or improvement using a particular target outlay compared to other target outlays. In still another embodiment, the present system and method may be programmed whereby multiple target outlays may be used with a known set of charted pitch locations to produce varying data according to the individual outlays of each of the targets. It is also contemplated that different pitchers, e.g., pitchers on the same team, may train using different throwing target outlays according to the type of pitcher in question. For example, a hard throwing pitcher may be able to use a throwing target with larger zones than a pitcher that does not throw as hard and/or relies on off-speed pitches for success. As understood by persons of ordinary skill in the art of baseball, a person that throws a fastball at great velocity, e.g., 152.9 to 159.3 km/h (95 to 99 miles per hour ("mph")), can get by missing intended pitch locations simply because a pitch thrown at such velocity is hard to hit. A pitcher with an average fastball of about 143.2 km/h (89.0 mph) must have command of his/her pitches for success seeing that an 89.0 mph fastball is easier to make contact with than a 99.0 mph fastball.

In another aspect, the application provides a system and method including a known throwing target having one or more colored target regions or zones, the system and method employing vision algorithms operationally configured to cluster the different pixels of one or more target regions according to the color distributions of the target regions in order to record actual location data where an object traveling through space contacts the throwing target.

In another aspect, the application provides vision algorithms operationally configured to detect velocity, i.e., estimate travel speed of an object in space, vertical displacement and actual location of a propelled object. In baseball terms, vision algorithms are operationally configured to detect the velocity, vertical displacement and actual location of a pitched baseball. Moreover, vision algorithms are operationally configured to detect the velocity, vertical displacement and actual location of a particular pitched baseball in or around a known strike zone and compare the measured velocity, vertical displacement and actual location of the pitched baseball to the intended velocity, vertical displacement and intended location for that particular pitch.

In another aspect, the application provides computer vision algorithms to automate the calculation of pitching statistics and store pitching statistics in an online accessible database.

In another aspect, the application provides a system and method employing data mining techniques to display targeted strengths and weaknesses of individual pitchers.

In another aspect, the application provides a system and method including machine learning techniques to automatically learn executable and non-executable sequential pitch patterns of individual pitchers.

In another aspect, the application provides dividing pitch statistics into groups dependent on where individual pitched balls travel through space in relation to a particular intended target location, target region and/or strike zone of a pitched baseball and the actual target location, region and/or strike zone realized for a particular pitched baseball.

In another aspect, the application provides a system and method including a computer visions system with a proprietary database comprised of an automated pitch data collection system useable with predetermined physical and virtual target outlays.

As understood by the skilled artisan in the game of baseball, a batter has decided whether or not to swing the bat at a particular pitch by the time the pitched baseball has traveled two-thirds of its travel distance in space toward home plate. Accordingly, the present application provides a system and method of measuring the velocity and trajectory of a pitched baseball during the first two-thirds of the baseball's travel distance as well as the velocity and trajectory during the last third, the last third of the baseball's travel distance in space occurring once a batter has typically already started the hitting motion.

In another aspect, the application provides a computer based system including, but not necessarily limited to a programmable smart phone, smart watch or other mobile electronic device for receiving and inputting pitching information or data into the system via video camera. Without limiting the invention, types of pitching information may include the intended pitch type, the intended pitch location, the realized pitch location, intended pitch velocity and actual pitch velocity. Input data may be stored remotely and accessed remotely by one or more persons.

In another aspect, the application provides vision algorithms for detecting a pitched baseball in flight as the baseball appears in the frame of the video camera of the system. In one embodiment, such may be achieved by modeling the visually recorded background using a mixture of Gaussian components. Multiple adaptive Gaussians may be employed to accommodate for the dynamic lighting and different surfaces recorded via the video camera. In addition, the expected baseball shape, color, size and velocity may be input to discard non-baseball objects that were not filtered out by the background subtraction.

In another aspect, the application provides a system and method for throwing target detection modeling including identifying target regions on a throwing target using a model image of a throwing target and a template image. Each detected target region or zone is segmented into a large number of clusters using an algorithm whereby each cluster is labeled based on its overlap with the template image. Thereafter, adjacent clusters sharing the same label are merged into one region or zone.

In another aspect, the application provides a video system and method for tracking and imaging a thrown baseball as it moves in a first direction toward a throwing target. An algorithm is used to track the baseball and predict its position in subsequent video image frames. The predicted position of the baseball is used to narrow the search for the position of the baseball in subsequent frames. The predicted position of the baseball is also used when the baseball cannot be detected in certain video frames. As a pitched baseball approaches a target, an algorithm is employed to track the baseball including any change in travel direction and/or velocity. In particular, the position and motion of the baseball may be analyzed in more detail to detect if the baseball (a) hits the ground and bounces off the ground before reaching the throwing target; (b) hits the throwing target frame, if any, and bounces back in a direction opposite the first direction; (c) misses the throwing target completely; or (d) hits the throwing target whereby the zone(s) contacted by the baseball are detected and reported electronically.

In another aspect, the application provides a motion capture system and method for estimating the velocity of a thrown baseball using video spatial and temporal resolution and the distance traveled by the baseball in the first five (5) recorded video image frames. The vertical movement or vertical displacement of the baseball may also be computed as the difference in height between a baseball's altitude when it first appears in frame and its altitude at a second location in space or when a baseball contacts the throwing target or when a baseball is caught by a hind catcher or other individual.

In another aspect, the application provides a motion capture system and method allowing for use of a video camera at more than one location relative a flight path of a target object. For example, in baseball terms, the application provides vision algorithms effective to allow a video camera to be set at more than one location in relation to a known pitching mound and corresponding home plate for recording pitched baseballs.

In another aspect, the application provides three-dimensional ("3-D") modeling using multiple cameras to track the flight of a thrown baseball and use stereo vision to extract and parametrize the 3-D flight path of the baseball. The 3-D information allows a hind catcher to start receiving pitches without having to use an actual throwing target to first set the various zones or regions of a virtual or phantom throwing target.

In another aspect, the application includes a system and method effective to provide two-dimensional ("2-D") and 3-D video analysis of an individual's throwing arm. A single video camera may be employed to model the motion of an individual's throwing arm during the act of throwing, e.g., a baseball pitcher delivering a pitch. A compact representation of the throwing arm's motion may be documented. The throwing arm's motion may be parameterized and stored in an online database. Stored information may be used to provide predictive data analytics for individuals, e.g., predictive performance information, stress applied to the throwing arm when throwing and/or other parts of the body, risk or probability of future injury, predictive performance information and risk of injury information where an individual performs the act of throwing from more than one "arm slot" or "arm angle."

In another aspect, the application provides a motion capture system and method allowing for computer database storage of one or more individual pitchers over an extended period of time. Machine learning algorithms are employed to analyze and mine the database to give predictive analytics to evaluation institutions such as college baseball personnel, international baseball personnel and professional baseball personnel. Suitably, profiles of successful pitchers may be recorded and recognized and used to develop and recommend personalized training protocols for individual pitchers. Robust clustering and feature selection algorithms may be employed to identify clusters of pitches sharing common features, i.e., measurement parameters. Each cluster may be considered as a unique profile.

In another aspect, the application provides statistical algorithms for correlating measured parameters with observed outcomes, e.g., pitcher performance improvement, performance based injuries. For example, classification algorithms may be employed for discrete value outcomes, regression algorithms may be employed for continuous value outcomes and outlier detection algorithms may be employed to look for anomalies in the collected data of the system.

In another aspect, the application provides a system and method for remote evaluation of athletes by coaches, scouts and other personnel belonging to one or more sports teams or organizations.

In another aspect, the application provides a system and method for in-house use by one or more sports teams and/or organizations for providing statistical information regarding pitcher performance per game outing and over time, e.g., a month, a full season, multiple seasons, a career, including multiple game outing data collected and stored to a database including, but not necessarily limited to an online accessible database. In addition, statistical information may be collected for pitchers of a particular team and used to provide team based data. Statistical information may be collected for starting pitchers, relief pitchers as well as data for pitchers serving both starting pitcher and relief pitcher roles during a season.

In another aspect, the application provides a motion capture system and method operationally configured to record and store information regarding individual pitchers including, but not necessarily limited to arm path, arm angle, weight transfer, the release point of the baseball from the throwing hand, the pitcher's tempo or elapsed time to perform the delivery of a pitch, body rhythm, rotational timing in relation to stride length, a pitcher's directional force toward a throwing target such as a throwing target or catcher, the direction in space of a pitcher's stride foot during the act of throwing, e.g., the slope of the stride foot, facial recognition to identify individual pitchers using the system, and combinations thereof. Because individual pitchers may have unique physical pitching mechanics, physical pitching mechanics may be recorded and used in combination with collected pitching data to improve and/or optimize individual pitching mechanics for one or more types of pitches in one or more particular locations. In a simplified example, the present system and method may provide information that a particular pitcher is more accurate locating curve balls in one or more particular locations in and around the strike zone when the throwing arm is located in a particular slot. Data collected via the present system may demonstrate that the same individual is more accurate locating fastballs or other types of pitches in one or more particular locations using a different arm slot than used when delivering a curve ball pitch. In another simplified example, collected system data may indicate that a particular pitcher has greater velocity when throwing a particular type of pitch when the pitcher performs the act of pitching at a particular rate or elapsed time, i.e., tempo. In still another example, collected system data may show that a particular pitcher achieves greater or less vertical displacement and/or velocity when aiming particular types of pitches at particular zones on a particular target outlay. Accordingly, the present system and method may provide a grading system for individual pitching mechanics in relation to one or more pitching attributes as described herein.

In another aspect, the application provides a motion capture system and method operationally configured to help guard against arm injuries to throwing arms by emphasizing the art of pitching rather than emphasizing raw velocity of pitches. Arm injuries may be reduced by increasing pitcher accuracy and/or pitch type and thereby minimizing individual game pitch counts for individual pitchers whereby less stress is applied to the throwing arm during a game session.

In another aspect, the application provides a motion capture system and method operationally configured to give individual pitchers easy and/or inexpensive exposure via remote computer vision technology rather than incurring costs related with travel and lodging for in person tryouts and showcases in front of by coaches, scouts and other personnel belonging to one or more sports teams or organizations.

In another aspect, the application provides a motion capture system and method for providing personalized pitching instruction to individual pitchers including implementing data mining effective to generate customized strengths and weaknesses of individual pitchers and for using machine learning tactics to devise individual pitching practice session protocols.

In another aspect, the application provides a system and method for baseball personnel, e.g., coaches, baseball scouts, individual players, to chart pitches during practice and game situations.

In another aspect, the application provides a system and method allowing individual pitchers to use computer vision in a smart phone application or "app" to record in real time (1) a model of a pitcher's delivery, (2) intended location and realized location of each pitch thrown in correlation with a physical target outlay and/or virtual target outlay, (3) intended pitch velocity and measured pitch velocity and (4) vertical movement of each pitch thrown.

In another aspect, the application provides a system and method providing inexpensive and/or readily accessible hardware needed to generate human performance related metrics.

In another aspect, the application provides a system and method of accumulating pitching data to classify or otherwise rank individual pitchers against other pitchers, present and/or past, in a computer database and/or to classify or otherwise rank specific groupings of pitchers in a multitude of pitching ability or performance categories. The system and method also provides machine learning algorithms effective to generate personalized strength and weakness reports for individuals and/or groups of persons.

In baseball, today there is no quantified strike zone, baseball statistics only document inside or outside of the strike zone. As such, no statistics exist to measure averages for pitchers executing pitches in distinct zones or areas of the strike zone. In addition, there are particular areas in and around a strike zone that particular pitchers may try to avoid locating pitches. There are also zones or areas outside of a strike zone that pitchers often purposefully target. The present application provides the ability to record data related to intended pitch location and actual or realized pitch location both in and outside of a strike zone. By implementing a throwing target having individual numbered zones and/or meaningful shaped zones and/or zones of meaningful colors, intended pitch location zones and realized pitch location zones may be visually recorded manually or via video equipment and there after used for training and/or evaluation purposes of individual pitcher performance generally and/or in regard to one or more individual opponent batters.

In one implementation of the system 100, one or more game type scenarios and the outcome of individual pitches, e.g., a called strike, a ball, a swinging strike, hit batsman, a foul tip, a batted ball and location on the field the baseball is hit, may be recorded and the data used to improve and/or train individual pitchers. In one simplified example, actual pitch location and/or pitch type data may be collected and analyzed in regard to batter outcome per at-bat, providing information regarding pitch location and/or pitch type that may be successful when facing a particular batter at various pitch counts during an at-bat.

As understood by persons of ordinary skill in the art of baseball, as of the time of this application, a throwing arm injury epidemic of sorts among baseball pitchers exists as a result of over use, e.g., young people playing too many games too many months out of the year. Because high school, college and professional recruiters and scouts give raw velocity so much weight, many young pitchers over throw in an attempt to impress such observers. As a result, pitchers are making themselves susceptible to injury. The present system and method provides an inexpensive way to (1) improve accuracy leading to lower pitch counts in games and to (2) collect pitching related data, other than just raw velocity, over desired periods of time that is effective to predict pitcher and reduce the number of arm injuries.

In baseball terms, the present application emphasizes the value of pitch efficiency, which refers to keeping pitcher pitch counts in games low by throwing higher quality pitches. Suitably, pitch efficiency pitches is achieved by locating pitches in particular zones in and around a strike zone by throwing one or more types of pitches. If a pitcher has a maximum pitch limit of eighty-five (85) pitches and sixty (60) of them are of high quality, the pitcher will get more outs with less pitches. If only twenty-five (25) of eighty-five (85) are high quality pitches, then typically less outs will be achieved with the same total pitch count. The present system and method teach and measure the quality of each pitch amongst several target zones and/or amongst several target outlays.

The oldest pitching metric in baseball other than strikes and balls is velocity. At present, radar guns still play the biggest role in the evaluation of a pitcher. The present application provides technology that is not only relatively inexpensive and accurate, but also provides additional pitcher evaluation parameters such as "perceived velocity." When a pitcher can control a slower pitch, e.g., a change-up, in a particular part of the strike zone or a particular area outside the strike zone, it not only puts less stress on the throwing arm but such can also make ones fastball appear faster to a hitter than its actual velocity—this is herein referred to as perceived velocity. No matter how fast a pitch is traveling, if a hitter sees the same pitch in the same location time and time again, the hitter has a much better chance of making contact with the baseball. If a hitter is forced to contemplate two or three different pitches that a pitcher can locate in particular zones in and around a strike zone, it becomes more difficult for a hitter to make solid contact with the pitched ball because a hitter cannot anticipate a certain type of pitch in a certain zone. Pitch command suitably throws off a hitter's timing and increases a pitcher's chance for success against individual hitters.

With reference to FIG. 1, in one simplified implementation the system 100 may include a target 115, an object 112 to be observed and recorded as it travels through space directionally toward a target 115 (see Arrow AA), a computer vision system including an image capturing system 117 set at a first location that is operationally configured to record images of the object 112 in flight toward the target 115 and to record images of the contacted target 115 and a computer system 119 programmed to process the images received from the image capturing system 117 to provide one or more items of information including, but not necessarily limited to object 112 velocity, flight path of the object 112 from a predetermined starting point in space to a target 115, the change in vertical altitude of the object 112 during flight from a predetermined starting point in space to a point of contact between the object 112 and the target 115 or the ground 123 in front of the target 115. Where the object is a spherical object, the present system 100 may be operationally configured to provide the spin rate of the object 112, the recorded point of contact of the object 112 on the target 115, predictive human performance related analytics, and combinations thereof.

Figure 2:
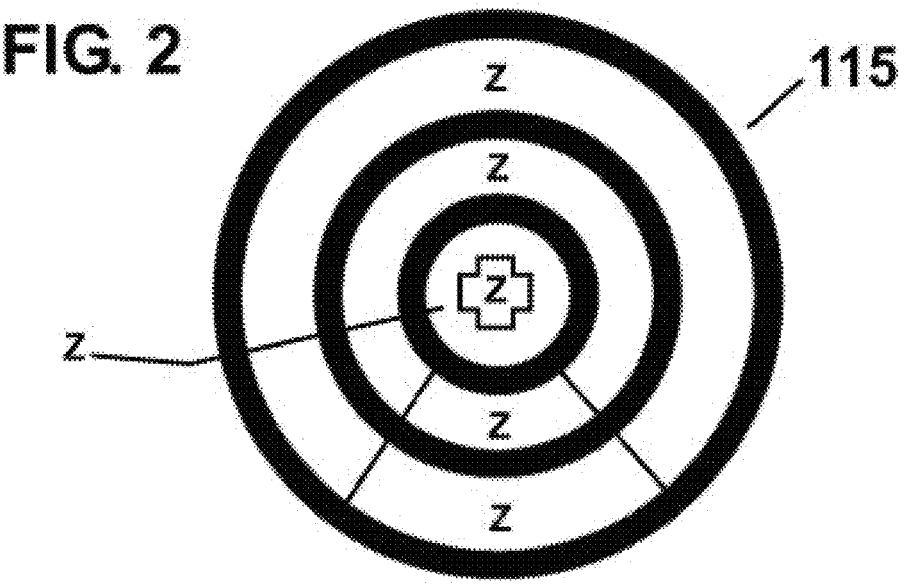
FIG. 2 is a front view of an exemplary target of the system of the application.
Figure 3:
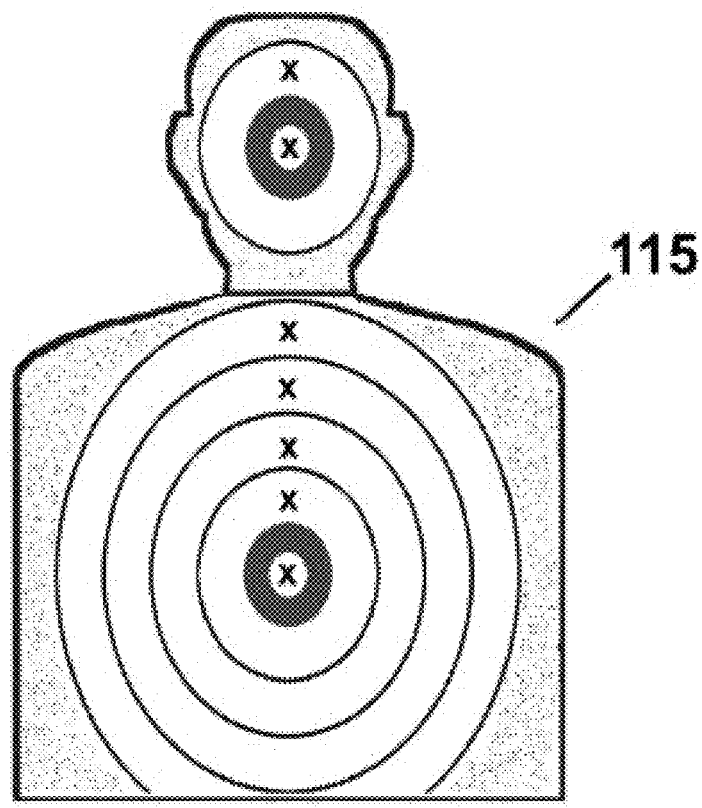
FIG. 3 is a front view of an exemplary target of the system of the application.
Figure 4:
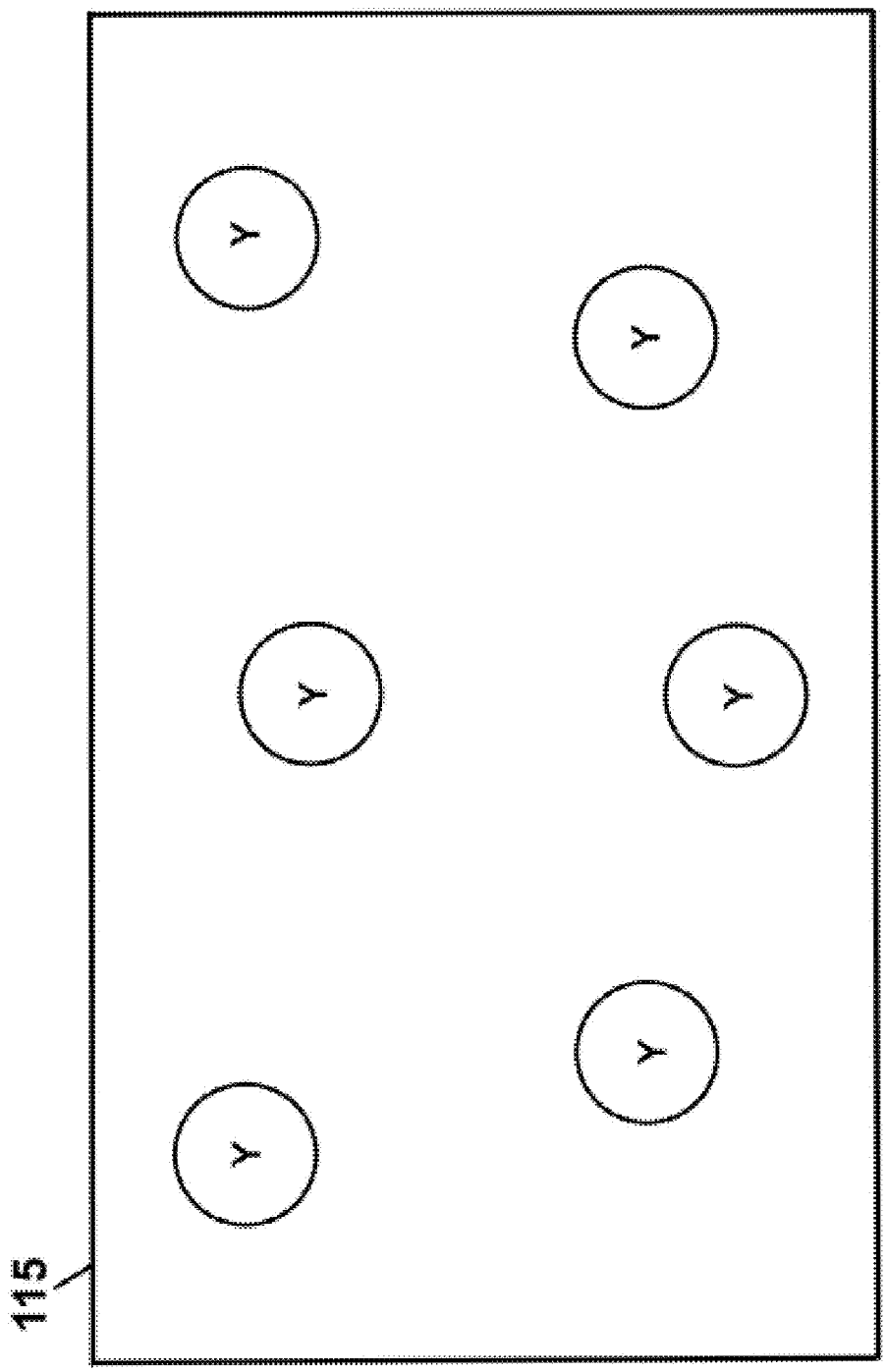
FIG. 4 is a front view of an exemplary target of the system of the application.
Figure 5:
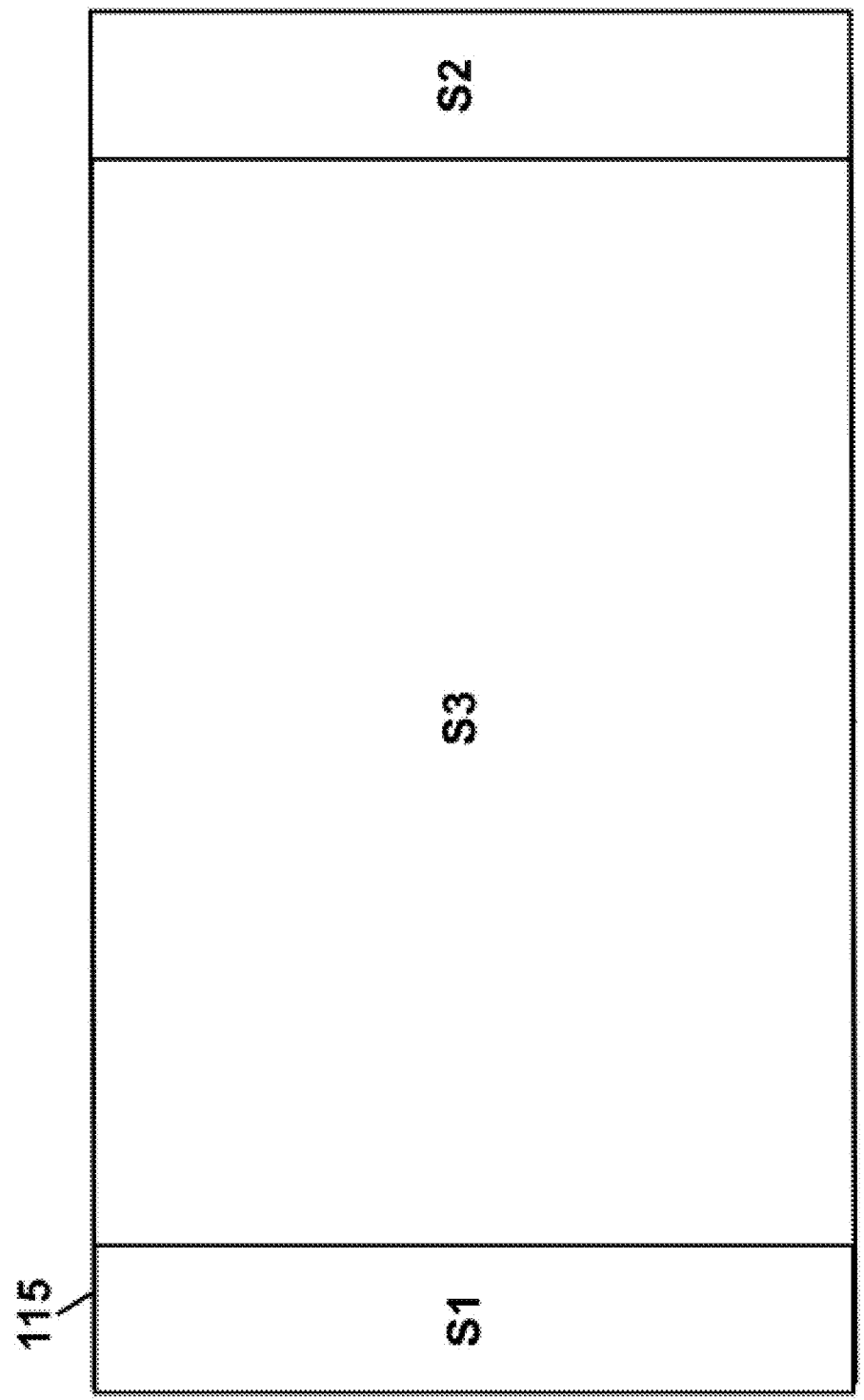
FIG. 5 is a front view of an exemplary target of the system of the application.

One suitable target 115 of the present system 100 may include a front surface defined by a plurality of individual or distinct target zones and/or non-target zones for aiming a particular object 112 and for avoiding contacting altogether. The size of the target. 115 and the layout of one or more target zones and/or non-target zones may vary according to the particular object 112 employed and the particular task or goal of a targeted exercise. For example, where the object 112 is a throwing dart, one or more target zones and/or non-target zones may include a bulls eye and circular rings on a surface including individual zones within the bulls eye and/or within one or more circular rings (see FIG. 2, zones marked "Z"). Where the object 112 includes a weapons projectile, one or more target zones and/or non-target zones may include a human shaped target on a surface (see FIG. 3, zones marked "X"). Where the object 112 includes an American football, one or more target zones and/or non-target zones may include one or more identified zones on a surface (see FIG. 4, zones marked "Y"). Where the object 112 includes a soccer ball, a target 115 dimensionally similar as a soccer goal may include one or more target zones (see FIG. 5, zones marked "S1" and "S2") and/or non-target zones (FIG. 5, zone marked "S3").

Figure 6:
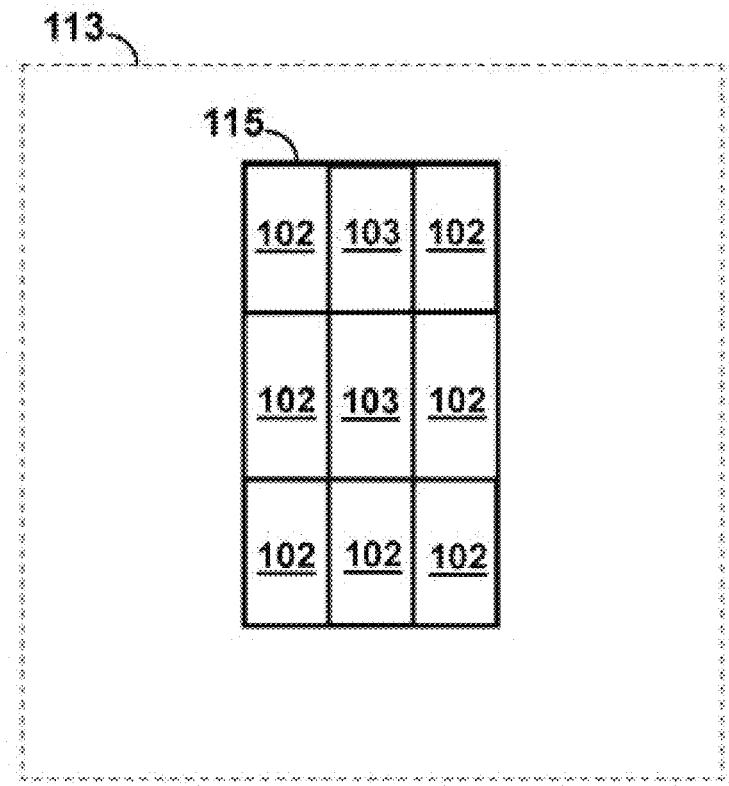
FIG. 6 is a front view of an exemplary target of the system of the application.
Figure 7:
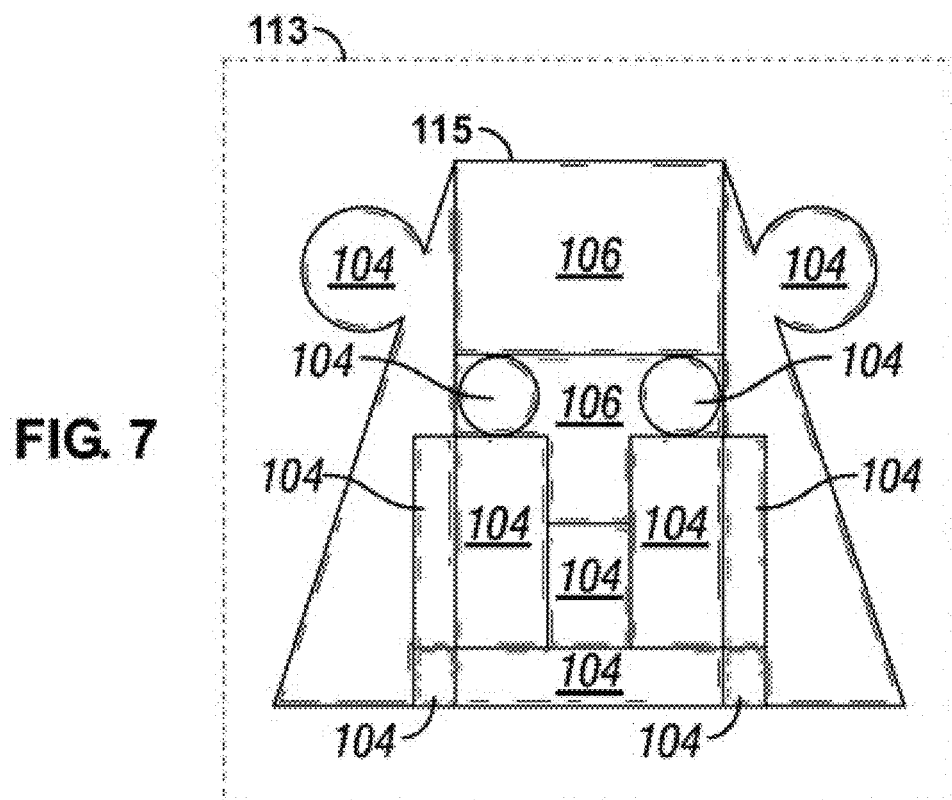
FIG. 7 is a front view of an exemplary target of the system of the application.

In baseball terms, where the object 112 is a baseball, the target 115 or "throwing target" may be located on a target surface 113 and include one or more target zones (FIG. 6, zones 102; FIG. 7, zones 104) to purposefully contact and/or non-target zones (FIG. 6, zones 103; FIG. 7, zones 106) to purposefully avoid contacting with a thrown object 112 such as a baseball. Suitably, the computer system 119 may be programmed to (1) recognize a particular physical target 115 amongst a plurality of stored target templates using vision algorithms to detect the distinct zones of the target 115 provided, (3) record the intended location of one or more individual pitches in or around one or more particular zones on the target 115, (4) record the actual location that the baseball 112 contacts the detected target 115 for one or more delivered pitches, (5) provide computational information regarding the accuracy of pitches thrown according to the intended location and actual location of contact of each pitch along the target surface 113, and (6) provide a database related to pitcher performance according to information collected and stored by the system 100. The system 100 may also be programmed to record an intended type of pitch to be delivered, the intended velocity for a particular pitch as well as measure the actual velocity of the pitch. The present system 100 may also be employed for other position players where arm strength and/or accuracy are important, e.g., hind catchers 155 throwing a baseball 112 from home plate 122 to second base; shortstops throwing a baseball 112 across the infield toward first base.

One suitable target surface 113 may include a substrate or material having at least a first planar surface. In one embodiment, the target surface 113 may include a textile or sheet like material whereby one or more releasable fastening members 114 may be implemented to maintain the target 115 in a vertical or upright position during use. Although not necessarily limited to a particular type of attachment, suitable fastening members 114 include, but are not necessarily limited to string, rope, fabric hook and loop fasteners, tape, adhesives, putty, clamps, wire, linked material, tie-wraps, bungee cords, and combinations thereof.

Figure 8:
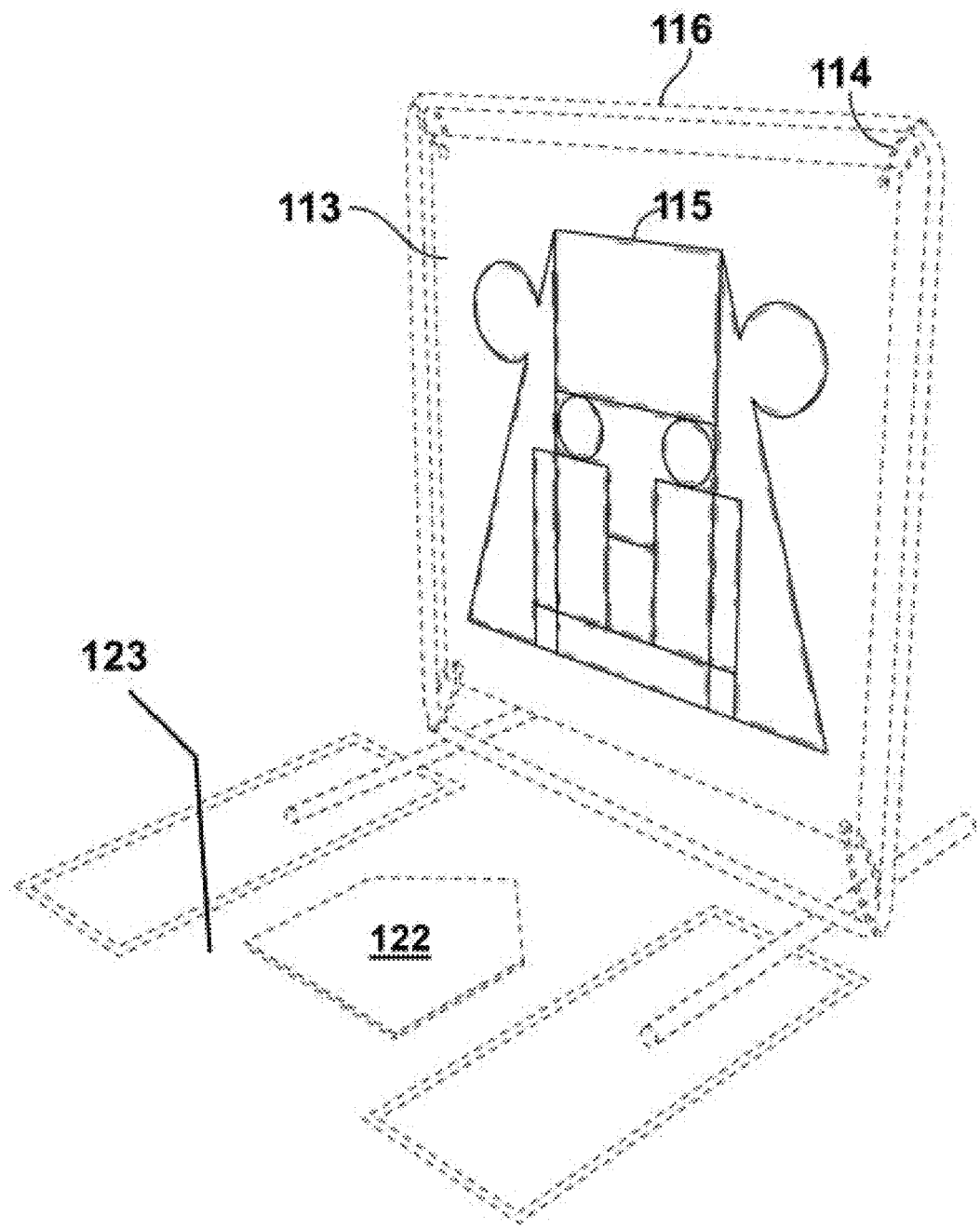
FIG. 8 is a front perspective view of an exemplary target and baseball home plate of the system including the target supported within a framework.

Depending on the type of fastening members 114 used, the target surface 113 may include a plurality of openings there through, the openings being operationally configured to receive the fastening members 114 for attaching the target surface 113 to a frame or framework 116 as depicted in FIG. 8. In another embodiment, the target surface 113 may include loops attached along its perimeter, the loops being operationally configured to receive one or more fastening members 114 or hang from a support such as beam or pipe. In still another embodiment, a sheet like target surface 113 may be suspended by fastening only the upper portion of the target surface 113 to a framework 116 or other structure such as netting material. In another embodiment the target surface 113 may be draped over a framework or the like in a manner effective to suspend the target 115 in an upright or vertical position for use. In yet another embodiment, the target 115 may directly receive one or more fastening members 114. It is also contemplated herein that the target 115 and target surface 113 be permanently attached to a framework 116 or other structure. Even still, the target 115 may also be represented on a solid wall or other solid substantially vertically aligned planar or non-planar surface as desired.

Without limiting the invention to any particular type of pitching target 115 or target outlay, suitable targets 115 and target outlays for baseball pitching may include targets as described in U.S. Pat. No. 6,155,936, issued on Dec. 5, 2000; U.S. Pat. No. 6,878,078, issued on Apr. 12, 2005; U.S. Pat. No. D612,002, issued on Mar. 16, 2010; U.S. Pat. No. 7,931,547, issued on Apr. 26, 2011; U.S. Pat. No. 5,439,211, issued on Aug. 8, 1995; U.S. Pat. No. D597,155, issued on Jul. 28, 2009; U.S. Pat. No. 8,579,734, issued on Nov. 12, 2013, each of which is herein incorporated by reference in its entirety.

Figure 9:
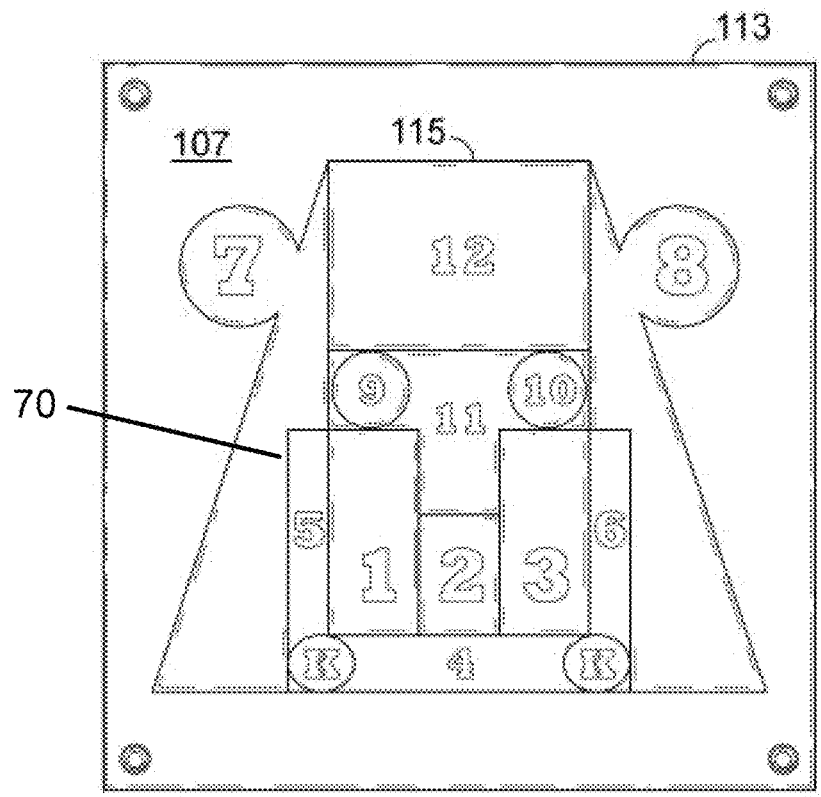
FIG. 9 is a front view of an exemplary target of the system of the application.

FIG. 9 shows a simplified embodiment of a suitable target 115 for use as part of the present system 100. This particular target 115 includes (1) target zones marked 1-10, (2) non-target zones marked 11-12, and (3) "K" target zones as shown. Suitably, the target zones 1-10, non-target zones 11-12, and K zones are separated by solid or broken lines or other dividers as desired. Although the lines or dividers are not necessarily limited to a particular width, a suitable baseball pitching target 115 may include solid lines having a width from about 0.32 cm to about 1.27 cm (0.125 inches up to about 0.5 inches). In one particularly embodiment, the solid lines may be about 0.64 cm (about 0.25 inches) in width. In any case, the lines/dividers should comprise a width great enough for a pitcher and/or other observer(s) and/or the image capturing system 117 and the computer system 119 to perceive and distinguish the various zones.

In one particular embodiment, a target 115 may include a single color across the target zones and non-target zones. In still another embodiment, a target 115 may include multiple colors—one color identifying the target zones and a different color identifying the non-target zones. In yet another embodiment including a non-zone region 107 surrounding zones 1-12, a target 115 may include multiple colors, a first color identifying the target zones 1-10, a second color identifying the non-target zones 11-12, and a third color identifying the non-zone region 107. Likewise, the lines/dividers may include a single color or multiple colors as desired. As shown in FIG. 9, the lines/dividers 70 of the various zones may be black in color. In another embodiment, another color may be used as desired or as otherwise required, e.g., white, fluorescent color. As understood by the skilled artisan, the size, type and color of lines/dividers may vary according to the use or intended purpose of a particular system 100.

Suitably, the image capturing system 117 is operationally configured to visually record a travel range 99 of an object 112 in flight to a target 115 beginning at an initial point in space that is a predetermined distance from a target 115 (see FIG. 1). In another embodiment, the image capturing system 117 may be operationally configured to visually record a travel range 99 of an object 112 from a source 120 of an object 112 to the target 115. In terms of athletics, a source 120 may include a throwing hand, a shooting hand or a kicking foot of an individual as well as the point of release of an object from a surface of hand-held sporting equipment, i.e., hockey stick, lacrosse stick, tennis racquet. In regard to firearm projectiles, a source 120 may include a firearm. For purposes of this application, the image capturing system 117, the computer system 119, including all hardware, software, databases, processors, wires, inputs, outputs, wireless network interfaces, and other electronics and computer programs may be referred to collectively as part of the "computer vision system."

In one embodiment, the image capturing system 117 may include a digital video camera as understood by the skilled artisan including an image capturing component and a recorder component for storing captured video images. Captured video images may then be communicated with an external computer system 119 or computer systems as shown in FIG. 1. In another embodiment, the image capturing system 117 and computer system 119 may be included on a single electronic device including, but not necessarily limited to a mobile personal computer. Suitable mobile personal computers with video capture functionality for use as part of the present system 100 include, but are not necessarily limited to laptop computers, tablet computer, smartphone, digital cameras, and combinations thereof where two or more image capturing systems 117 are employed. In still another embodiment, a mobile personal computer may be used to capture video images and a separate computer system 119 may be used to interpret the images as programmed herein.

In another embodiment, the computer system 119 may be programmed to detect or recognize a particular physical target 115 and the distinct zones on the target 115 from amongst a plurality of target outlays stored in the system 119. Once the physical target 115 is removed and replaced with a person, i.e., a hind catcher 155, the computer system 119 is programmed to (1) provide a virtual target 115 in the location where the physical target was identified, (2) record the intended location of one or more individual pitched baseballs 112 in or around one or more particular zones on the target 115, (3) record the actual location that the baseball 112 contacts a virtual target 115 according to where the catcher's mitt is located when receiving the baseball 112 therein, (4) provide computational information regarding the accuracy of pitches thrown according to the intended location and actual location of contact of individual pitches along the target 115 and (5) provide a database related to pitcher performance according to information collected and stored by the system 100. In another embodiment, a virtual target 115 outlay of the computer system 119 may be detected according to the location of a hind catcher and/or other object such as a home plate 122.

In another embodiment, the computer system 119 may be programmed to use computer vision algorithms in conjunction with one or more objects 112 and one or more physical targets 115 and/or virtual targets 115 to capture and document data related to a particular target 115 outlay including, but not necessarily limited to individual pitcher delivery mechanics, performance metrics, predictive data, and combinations thereof. Collected information may be maintained in a network, an online database and/or via other electronic storage media as desired for further use as desired or as may be programmed as part of the computer system 119.

Figure 11:
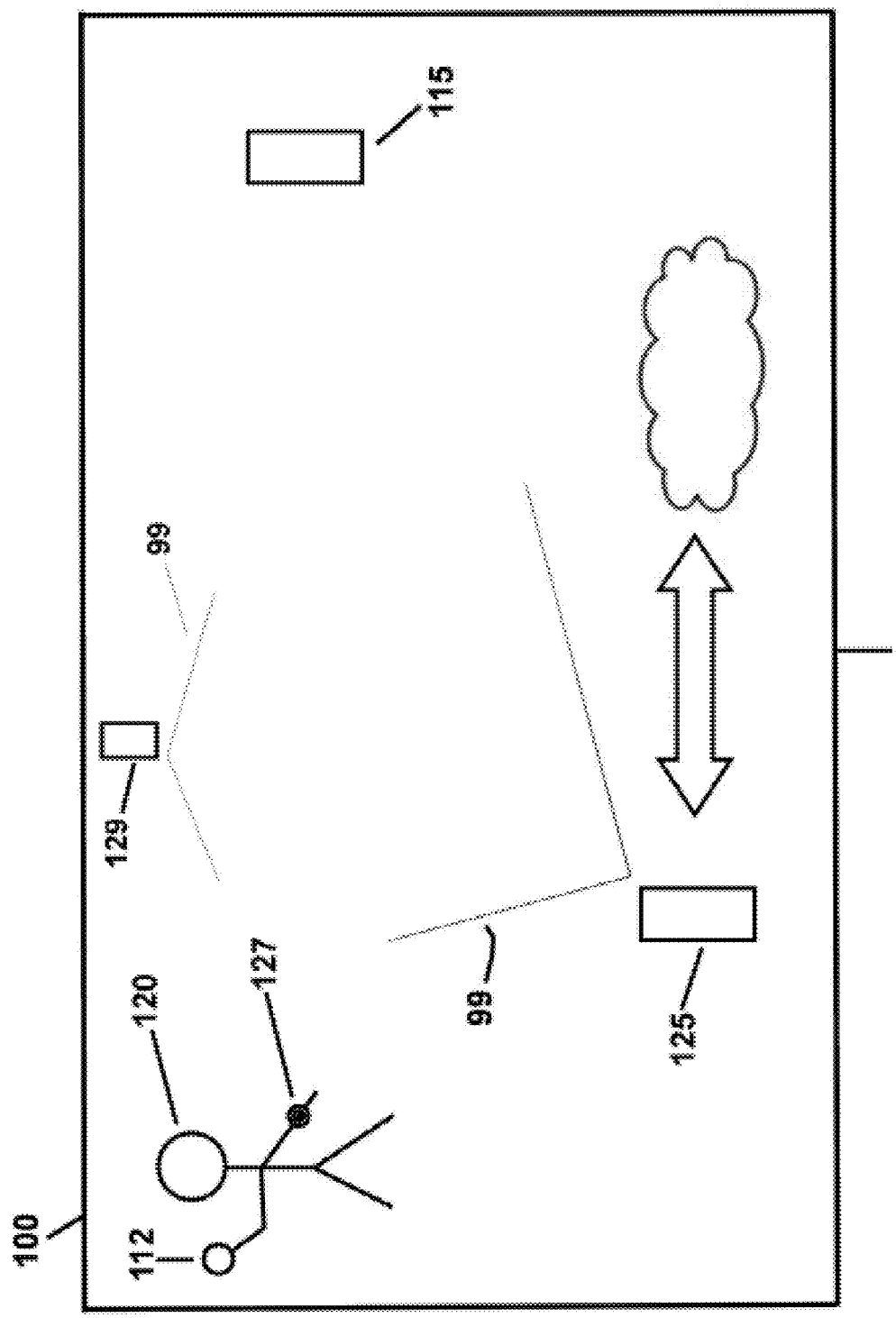
FIG. 11 is a simplified illustration of an embodiment of the system of the present application.

As shown in FIG. 11, in one simplified baseball related embodiment a computer vision system may be employed on a mobile computing device such as a smartphone 125 to be held by a second individual, i.e., non-pitcher, or secured to a tripod or other support and positioned in a manner effective to video record a pre-programmed travel range 99. The computer vision system may be programmed to identify a particular target 115 that is set a predetermined distance from a pitcher 120. As understood by the skilled artisan, according to Major League Baseball rules the distance between a pitching rubber and home plate is 18.44 meters (60.5 feet). According to Little League Baseball rules, the distance between a pitching rubber and home plate is 14.02 meters (46.0 feet). Regardless the distance, a target 115 may be located a distance less than, greater than or equal to home plate. In one suitable embodiment, a target 115 may be positioned in a location similar as a catcher's mitt of a hind catcher. As understood by persons of ordinary skill in the art of baseball, the distance of a hind catcher from home plate may vary according to the location of a particular batter in a batter's box. As such, in one embodiment a target 115 may be located from about the rear edge of home plate 122 to about 0.91 meters (about 3.0 feet) behind home plate 122—see the location of the target 115 as set behind home plate 122 in FIG. 8.

In one embodiment of the present system 100, a smartphone 125 may be positioned as shown in FIG. 11. As understood by the skilled artisan, a smartphone 125 can include a processor, a memory, a display, a network interface and a video camera operationally configured to capture a series of video images including a time associated with each image. As also understood by the skilled artisan, one or more applications for performing the methods described herein may be downloaded to the phone from a remote code repository. 2-D image data captured using the smartphone 125 camera may be used to generate pitching related information associated with a baseball 112 as discussed herein. 2-D image data may also be output via a smartphone 125 display and/or other output mechanisms and/or uploaded to one or more remote servers, including, but not necessarily limited to websites, social media websites, email transmission, facsimile transmission, and combinations thereof, for sharing and/or storing the information. Likewise, data used to generate pitching information may be stored directly on a smartphone 125 and/or uploaded to one or more remote servers. In addition, individual image frames, or a group of individual frames, of video recorded pitches may be stored and regenerated as desired.

In an embodiment of the system 100 as illustrated in FIG. 11, the system 100 is suitably operationally configured to (1) document or record a specific location where a particular pitch is being aimed on a target 115 prior to delivery of the pitch—the intended location being identified by a distinct zone on the target 115, (2) record the actual pitch location a baseball 112 strikes the target 115 via the smartphone 125 video camera, (3) store the information in a smartphone database and/or other database including, but not necessarily limited to a cloud communications network 130 (hereafter "cloud 130") and (4) using software, generate data related to the intended pitch location and the realized pitch location, as well as the velocity and the vertical displacement of the pitched baseball 112.

In one embodiment, intended pitch location and/or intended velocity and/or pitch type and/or intended vertical displacement may be entered into the smartphone 125 manually via a smartphone 125 touch screen key pad. In another embodiment, information may be entered into the computer vision system via voice recognition software (or "voice recognition") provided as part of the system 100 or voice recognition previously installed on the smartphone 125. The computer vision system may also be programmed to enter a plurality of intended pitch locations and/or pitch types, a.k.a., a "series of pitches" or "sequence of pitches," manually and/or verbally. Voice recognition and pitch series input data allows a pitcher 120 to enter pitch intent information into the smartphone 125 without having to physically touch the smartphone 125, i.e., without having to walk over to the smartphone 125 between each individual pitch to be delivered toward the target 115. Such is beneficial in practice sessions where an individual pitcher 120 is practicing alone saving time otherwise spent manually entering information into the smartphone 125. As understood by persons of ordinary skill in the art of baseball, the activity of practicing pitching is often referred to as a "side session" or "throwing a side" and often takes place in what is known as a "bullpen" or a "side mound."

In game type scenarios, the system 100 may include a computer vision system operationally configured to capture and record "catcher signals" or "signs" being communicated from a hind catcher 155 to a pitcher 120 in regard to individual pitch location and/or pitch type according to a layout of zones for a particular target 115. The information may be used to document intended pitch location and/or intended pitch type. In one embodiment, an image capturing system 117 as provided in FIG. 1 may be used to capture and record catcher signals. In another embodiment, a different image capturing system 117 may be used as part of the system 100 for capturing and recording catcher signals. For example, a second image capturing system 117 may be located beyond an outfield fence at a position effective to record a catcher's hand signals unobstructed, e.g., a position near center field similar as the location of television cameras used in videoing live baseball games.

As understood by the skilled artisan, a second individual may enter information into the computer vision system, e.g., a smartphone 125, manually or via voice recognition. For example, a second individual such as a pitching coach may verbally communicate pitch intent information to a pitcher 120 regarding one or more particular pitches to be delivered toward the target 115—the verbal command also being simultaneously communicated to the smartphone 125 via voice recognition. In another embodiment, pitch intent information may originate with a pitcher 120 who verbally communicates pitch intent information to a second individual for manually entering the information into the smartphone 125.

With further reference to FIG. 11, the system 100 may also include a communication device 127 wearable by an individual pitcher 120, the communication device 127 being effective to transmit pitch intent information to a computer vision system in relation to a known target 115 outlay. A suitable communication device 127 may include a display for communicating pitch intent information and/or a speaker for providing audible pitch intent information. One particular communication device 127 may include a smart watch or bracelet. In another embodiment, a communication device 127 may be worn around the neck, on part of a player uniform including a cap or belt, on a sweatband or on a glove of an individual pitcher 120. In still another embodiment, a communication device 127 may be installed as part of a pitching rubber on a pitching mound. In still another embodiment, a communication device 127 may be installed within a resin bag as understood by the skilled artisan. In yet another embodiment, a communication device 127 may be set directly upon a pitching mound.

With further reference to FIG. 11, a pitcher 120 may enter pitch location and/or pitch type information into the communication device 127 manually via keys or keys on a display or via voice recognition into a microphone on the communication device 127 prior to performing an individual pitch or a series of pitches. The information is suitably transmitted via wireless communication to the smartphone 125 prior to delivery of an individual pitch or series of pitches where after the computer vision system is operationally configured to video record realized pitch location to provide comparative data in relation to intended pitch location. The visual display, microphone and/or speaker of a communication device 127 may be similar as used on smartphones and other portable computer devices.

Comparative pitching related data may be stored over time in a system 100 database and used or interpreted as desired. As an example, an individual pitcher's 120 accuracy may improve over time in relation to locating one or more particular types of pitches in one or more particular zones of a particular target 115. In addition, recorded system 100 data may indicate that an individual pitcher 120 is more accurate locating particular types of pitches in one or more particular zones in relation to one or more pitches executed. For example, the data generated by the system 100 may demonstrate that a particular pitcher 120 may have better command of a curve ball pitch in a particular zone of a particular target 115 when the prior pitch was also a curve ball. In another example, the data generated by the system 100 may demonstrate that a particular pitcher 120 may have better command of a fast ball aimed at a zone low on a particular target 115 where the prior pitch, regardless of pitch type, was also intentionally aimed low on the target 115. Because any particular pitcher 120 may develop one or more accuracy traits on an individual basis, the above examples are not meant to be limiting in scope but rather provide simplified illustrations of the types of information that may be generated by the present system 100 by incorporating knowledge of intended pitch location and/or intended pitch type prior to the recordation of the pitch performed.

The combinations of pitch location and/or pitch type data that may be generated via the system 100 is not limited in scope, but may be generated or programmed according to the needs of one or more particular end users. For example, a Major League Baseball team may use the system 100 to generate data for individual pitchers facing particular individual batters in regard to a series of pitches to be performed when facing a particular batter. Pitch location, pitch type, pitcher success, batter success (the type of hit and/or where in the field the baseball 112 is hit), swing and miss information, the type of bat contact made with a particular type of pitch in a particular pitch location, e.g., ground ball, fly ball, pop up, hit off the end of the bat, jammed as the term is used in baseball, and other data may be generated using the present system 100 according to information stored in the system 100 database. As such, it is further contemplated that a communication device 127 be employed to communicate pitch location and/or pitch type for individual pitches and/or a series of pitches in relation to a particular batter at the start of a particular at-bat—information communicated to a pitcher, a hind catcher, or both. Other position players may also be equipped with a communication device 127 in order to provide defensive information according to hitter tendencies and/or hitter performance in relation to particular pitch location and/or pitch type.

Figure 12:
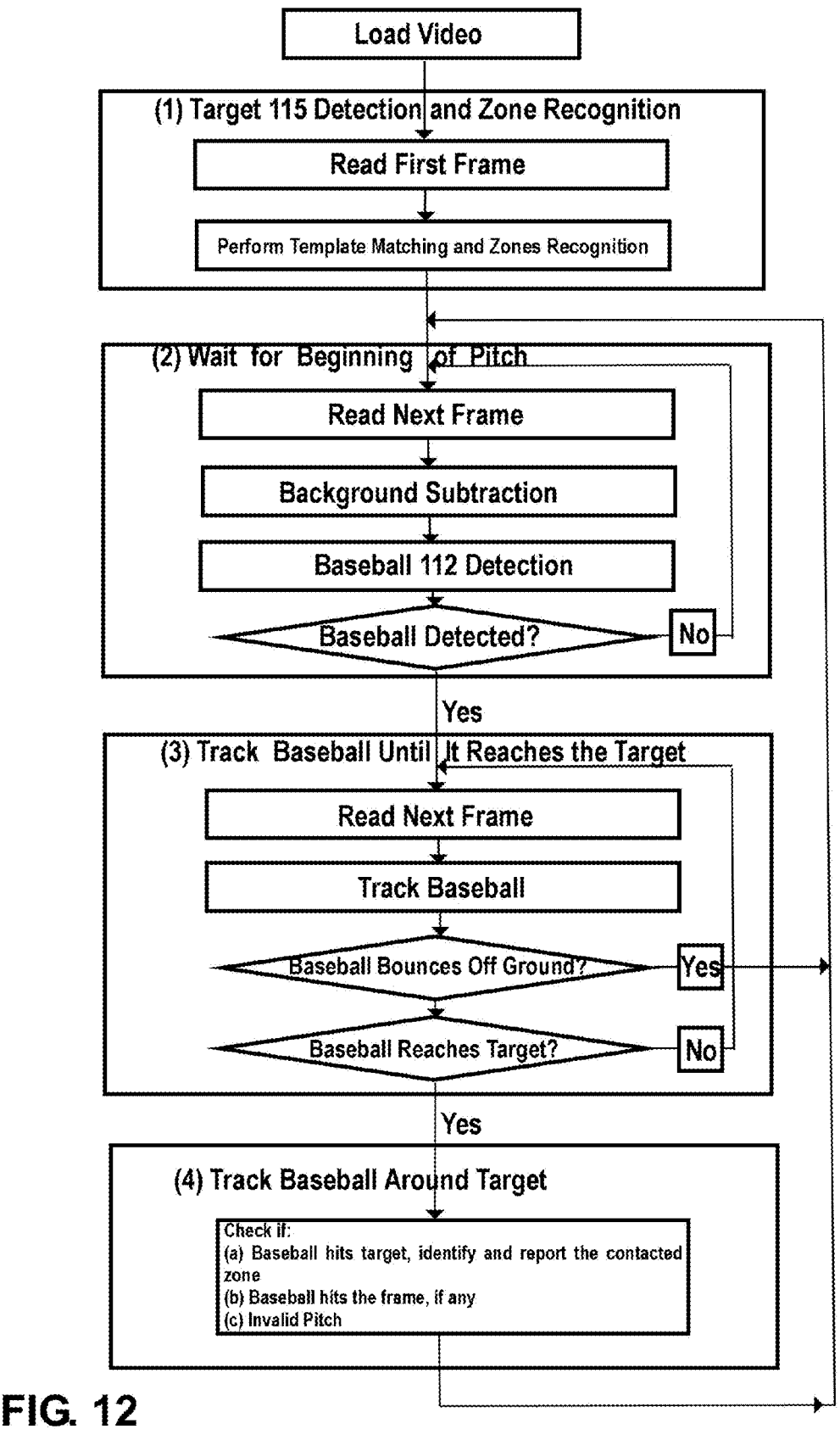
FIG. 12 is a flowchart illustrating the tracking of objects being directed through space to a target.

In an embodiment of the system 100 for baseball pitching including a physical target 115 used for aiming individual pitches, the system 100 may employ a computer program as shown in FIG. 12. In this embodiment, the computer program includes developed software having four main parts. The input data includes video files comprising recordings of successive pitches. The first frame is used to locate a physical target 115 using template matching and recognizing the zones of the target 115. Next, the software enters in a loop that has the three remaining components. The second part detects the first appearance of a baseball 112 in a scene of the travel range 99. The third part tracks the baseball 112 until the baseball 112 reaches the target 115. Here, the software is also capable of recognizing instances where a pitched baseball 112 makes contact with the ground 123 prior to reaching the target 115. The final part continues tracking the baseball 112 around the target 115. This component considers different possible scenarios, e.g., baseball 112 contacting the target 115, baseball contacting a framework 116 supporting the target 115, and an invalid pitch. Once the iteration of the loop is completed, the context may be cleared thereby returning to the first part. Suitably, the software ends its executions once all the video frames are processed.

In one embodiment, the software may be developed using C++ with the Open Source Computer Vision Library ("OpenCV"). As understood by the skilled artisan, OpenCV suitably accelerates the development of computer vision and image processing applications while targeting production systems. OpenCV also includes functions for machine learning primitives.

Target Detection

Although not necessarily required, a suitable target 115 may include a plurality of distinct zones separated by solid lines, each zone including a particular solid color and the solid lines including a color not used as the color of any of the individual zones. To locate such a target 115 using the computer vision system a template matching technique may be employed. In one embodiment, single-scale template matching may be employed. In another embodiment, multi-scale template matching may be employed. Using one or more video recordings, the border of a target surface 113 may be manually located. Next, an image of the target 115 may be extracted and saved as a template. OpenCV suitably provides several score functions for template matching including a normalized cross-correlation based function. However, a template matching technique may experience limitations. For example, if the distance and/or angle from the image capturing system 117 to a target 115 changes, the apparent target 115 size changes and the algorithm employed may fail to detect the target 115. An achievement of the present application to overcome such a limitation and make the matching scale constant or invariant includes using multi-scale template matching for the best region on the target 115 that matches the template. By scaling the height and the width of the target 115 independently by a factor ranging from about 50.0% to 200.0% by an increment of 5.0%, the search is suitably repeated for the best matching region of the whole target 115.

Target Zone Recognition

Figure 10:
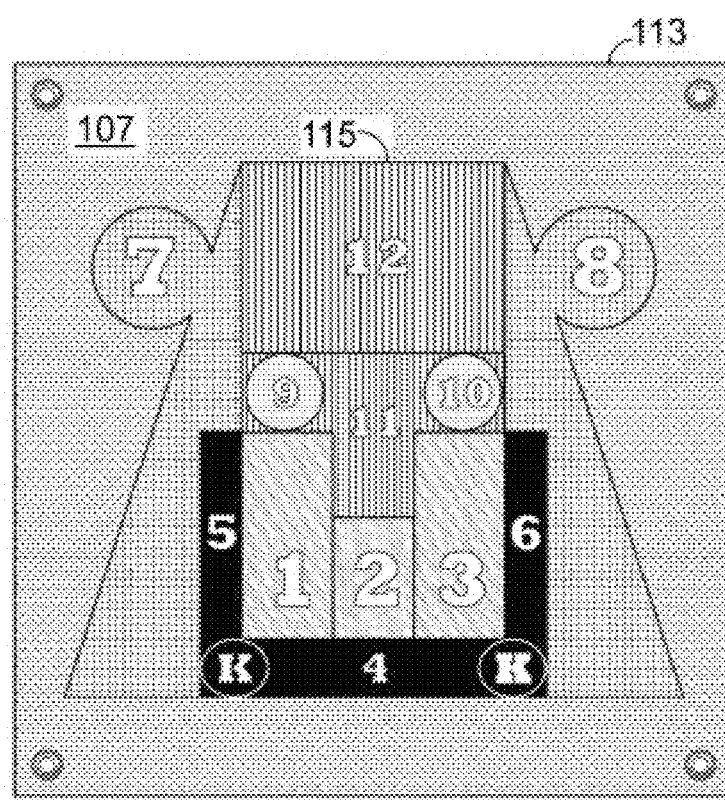
FIG. 10 is a front view of an exemplary colored target of the system of the application.

Once a target 115 is detected from a template, the system 100 suitably employs an algorithm to detect and identify distinct zones on the target 115. In one embodiment, thresholding a target 115 image by identifying edges or borders of distinct zones may be employed to detect or recognize distinct zones on the target 115. In another embodiment, different pixels of the target 115 may be clustered according to their color distributions. For example, an expectation-maximization algorithm ("EM algorithm") may be employed to cluster all pixels of a target 115 based on their three-dimensional colors, i.e., red, green, and blue. Each cluster, characterized by an average color and a covariance matrix, corresponds to pixels that share similar colors. Since different zones on a target 115 may have a common color (see zones 7 and 8 in FIG. 10) an additional step to split clusters that combines multiple zones into sub-clusters may be employed. Based on the fact that pixels from different zones on the target 115 do not belong to the same connected component according due to the lines defining the individual zones, once the pixels of the target 115 are clustered, each cluster is analyzed to identify its connected components. Next, each connected component of neighboring pixels belonging to the same cluster is considered to be part of the same distinct zone on the target 115. This approach ensures that regions from different zones are not combined into the same connected component.

Figure 13:
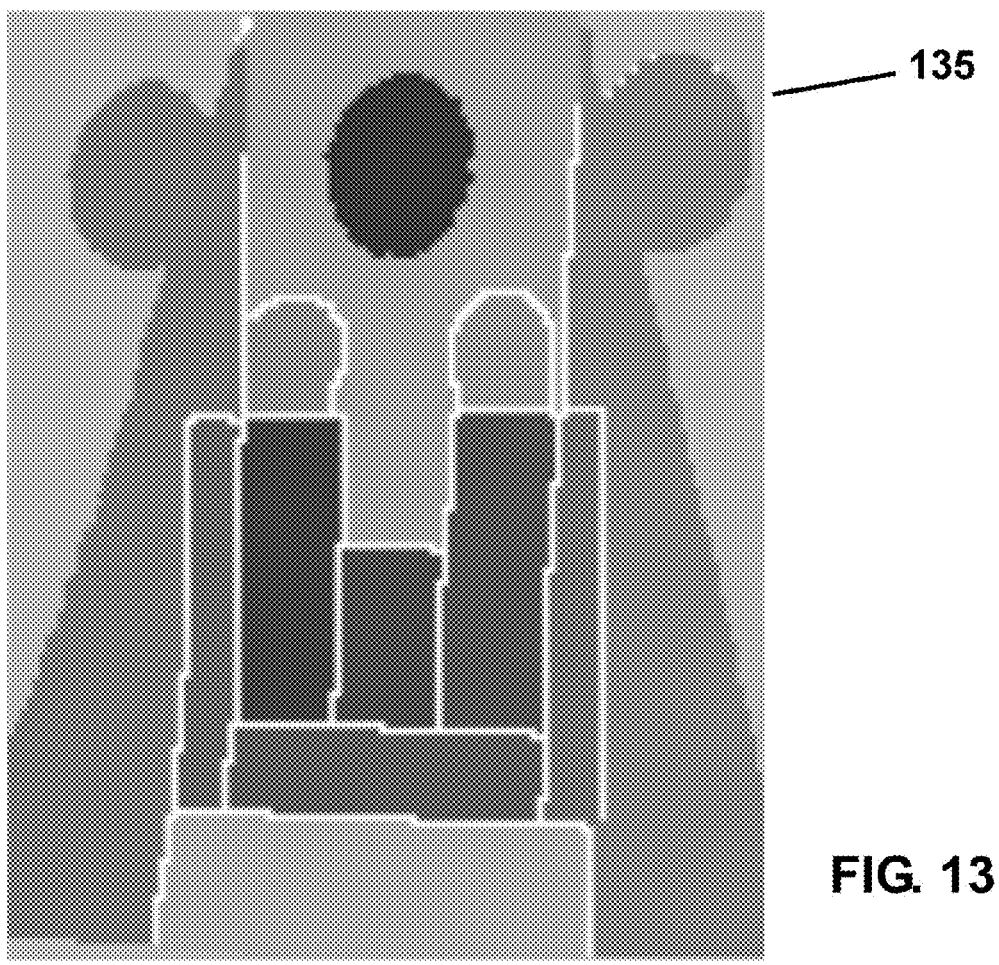
FIG. 13 is a sample model of individual target zones generated via the target zone recognition part of the system and method of the present application.

It is possible that some zones of a target 115 are partitioned into multiple connected components. Thus, an additional step may be employed effective to merge all adjacent connected components that have similar colors. First, a model target is generated that assigns a unique color and label to each zone on the target 115. This step only needs to be performed once, however, it may be repeated in the event the target 115 to be used changes, e.g., a different size target, a different zone outlay, the location of the image capturing system 117 is changed. A sample model 135 of the target zones generated is shown in FIG. 13—the target 115 employing white lines defining distinct zones of varying shades of grey to black.

Figure 14:
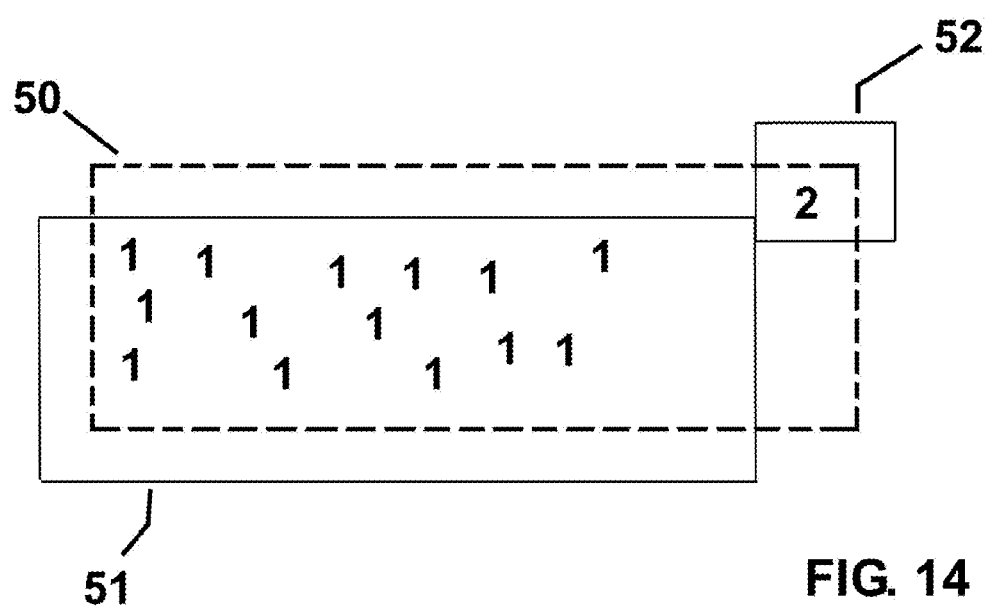
FIG. 14 is a simplified illustration of the labeling process for labeling connected components of a target of the present application.

Each pixel from a connected component is part of a zone in model 135. To label each connected component, the percentage of its pixels to each zone is calculated and the region that has the highest percentage is selected. FIG. 14 illustrates the labeling process where the broken line rectangle 50 outlines the connected component and the solid line rectangles 51, 52 outline a model target region. In this instance, the connected component will be mapped to the region 1 as illustrated.

In one embodiment, the EM algorithm is more effective where a large number of clusters are used for the clustering component of the algorithm, e.g., about thirty clusters. Large number of clusters makes the EM algorithm more sensitive to color variations. As such, identified clusters can distinguish between the different colors even when the illumination of the target 115 varies significantly. In addition, a large number of clusters is effective to cause some clusters to be dedicated to the lines defining or separating the individual zones. As a result, connected components suitably do not mix pixels from different zones.

Baseball Detection

Figure 15:
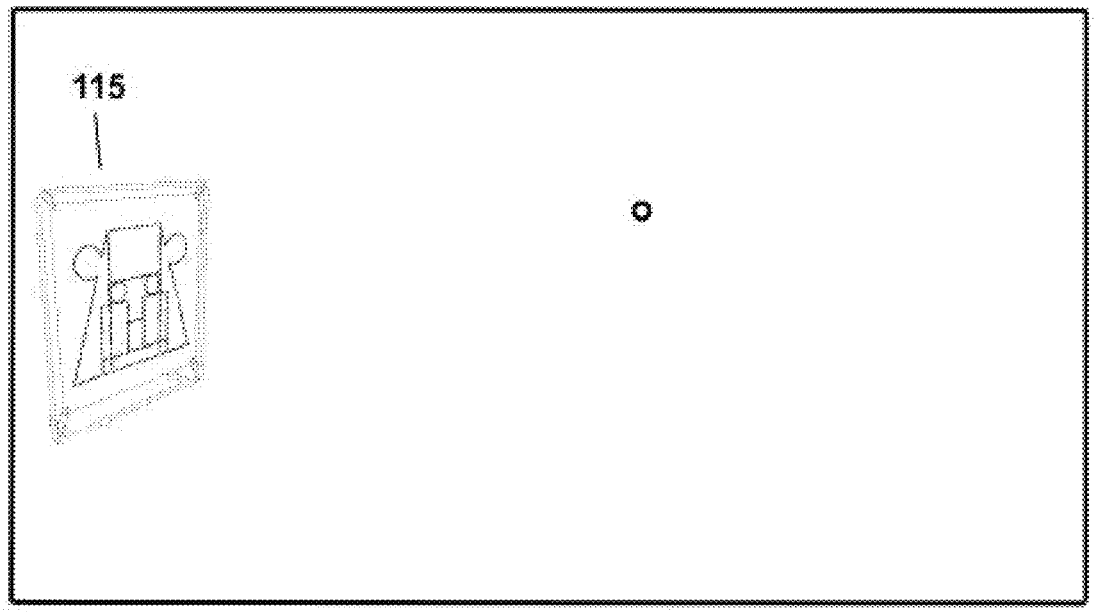
FIG. 15 is an image of a baseball in flight toward a target used as part of the present system and method to identify the baseball using background subtraction.
Figure 16:
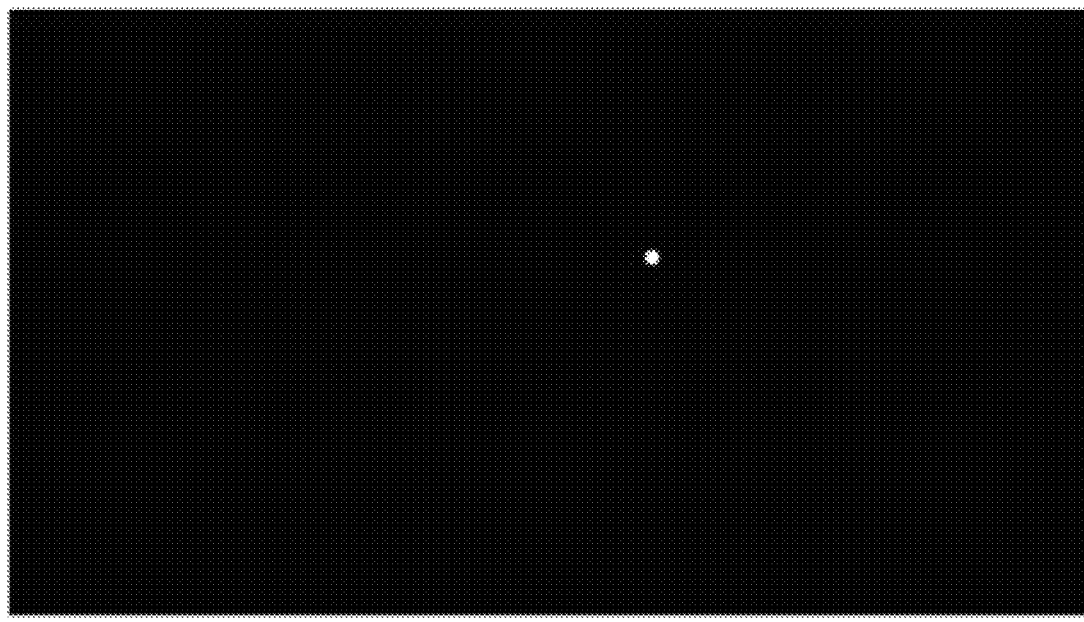
FIG. 16 is a visual representation of the background subtraction of the image of FIG. 15 based on MoG for video with a static background detecting the moving baseball with no false positives.
Figure 17:
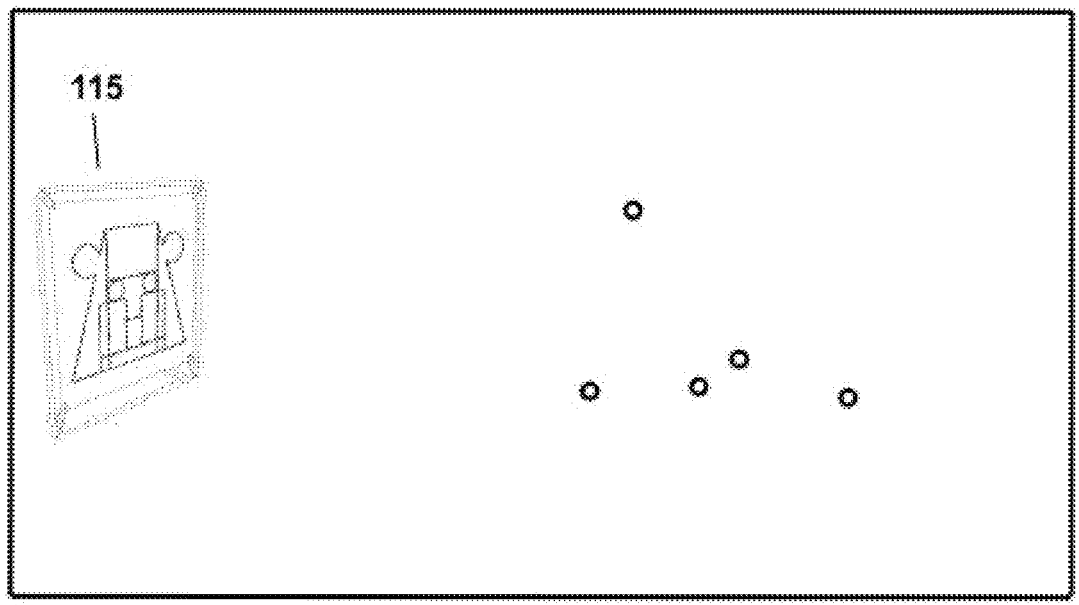
FIG. 17 is an illustrative image of a baseball in flight toward a target used as part of the present system and method to identify the baseball using background subtraction with a moving camera lens.
Figure 18:
FIG. 18 is a visual representation of the results of background subtraction of the image of FIG. 17 based on MoG for video with a moving camera lens identifying several false positives.

For detection of a baseball 112 in flight toward a target 115, one background subtraction method that may be employed is based on a Mixture of Gaussians ("MoG") approach in OpenCV. Such approach is suitable when a background of a visually recorded travel range 99 is static. However, where there is a dynamic background, e.g., a moving camera lens, tree motion due to wind, windblown leaves, windblown trash, flying insects, a moving vehicle in the background, a person walking in the background, e the MoG may result in false positives. FIGS. 15 and 16 demonstrate exemplar results of background subtraction based on MoG for video with a static background detecting a moving baseball 112 with no false positives. FIGS. 17 and 18 demonstrate exemplary results of background subtraction based on MoG for video with a moving camera lens identifying several false positives.

In one embodiment, the false positives of FIG. 18 may be overcome or otherwise reduced via implementation of kernel density estimation ("KDE"). However, processing time for KDE is considered slow in the art, e.g., 400 ms to process a single frame. As such, in one suitable embodiment, MoG background subtraction in addition to a foreground subtraction step may be employed to reduce the number of false positives and keep frame processing time at a minimum.

Foreground Subtraction

As understood by the skilled artisan, the problem of motion noise in videos may be caused by different factors including dynamic background, e.g., moving camera lens, tree motion due to wind, and/or moving entities such as moving cars or flying birds captured by a video camera. Using a high frame rate of video recording, objects moving at a speed less than the anticipated speed of the baseball 112 are programmed to appear to be static between two consecutive frames. This is in contrast to a faster moving baseball 112 in flight that exhibits a small position shift between consecutive frames. Thus, after the MoG background subtraction step, the foreground pixels between two consecutive frames can be subtracted and the following rules are applied:

Rule 1: if a moving object, detected as foreground after the MoG background subtraction step, is not detected in at least three consecutive frames (after subtracting consecutive frames), the moving object is removed from the foreground.

Rule 2: if a moving object has not moved more than a predefined number of pixels, the moving object is removed from the foreground.

Tracking of an Object

In some instances, an object such as a baseball 112 may not be detected in some frames, e.g., a background subtraction algorithm may fail to detect a baseball 112 in flight. Kalman filtering may be employed to predict the position of a baseball 112 and maintain an uninterrupted recordable flight path of the baseball 112.

Herein, different scenarios are considered while tracking a baseball 112 as it travels toward a target 115. A first scenario involves a baseball 112 contacting and typically bouncing off the ground at a point in front of the target 115. As a result, if the baseball 112 position is detected moving higher in altitude than previous positions before reaching the target 115, it is assumed that the baseball 112 has hit the ground and bounced upward. The result is recorded as an invalid pitch (see FIG. 12—for invalid pitch go back to part two and wait for the next pitch).

When a baseball 112 reaches a target 115, part four of the software is triggered (see FIG. 12) whereby motion and position of the baseball 112 are analyzed to detect if the baseball 112 (a) hits the target 115, (b) hits the target frame 116, (c) travels in front of the target 115 and misses the target 115 or (d) misses the target 115 and disappears behind the target 115 undetected.

Each of the four scenarios in the previous paragraph are suitably detected according to an algorithm as discussed below.

Baseball Hits the Target

When a baseball 112 hits a target 115 that is constructed from one or more textiles, plastics, or other flexible material(s), the target 115 suitably is deformed at the point of impact of the baseball 112 on the surface of the target 115 whereby the target surface 113 changes from a substantially planar surface to a non-planar surface for a period of time until the target 115 reassumes its original planar surface orientation after impact. In regard to the computer vision system of the system 100, at impact many of the target 115 pixels will start moving in between frames. Suitably, the system 100 can distinguish between impact type motion and minor motions that may be caused by wind or by a baseball 112 traveling close to the target 115 at a high enough speed to disturb the target 115.

Figure 20:
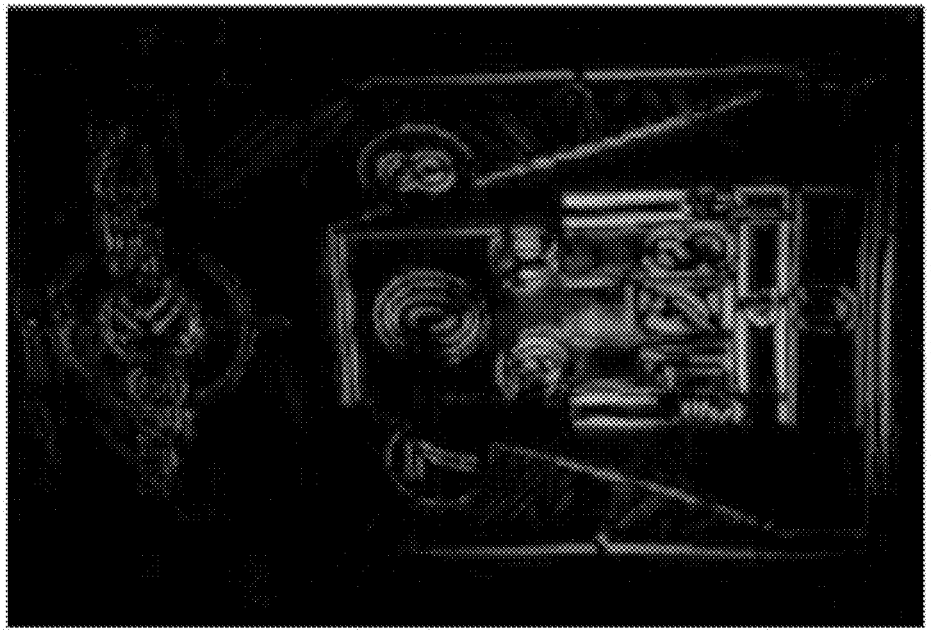
FIG. 20 is a visual representation of the identified pixels of the target of FIG. 19 once the target is impacted by the baseball.
Figure 19:
FIG. 19 is a visual representation of part of the system including the identified pixels of a moving baseball prior to the baseball contacting a target.

With further reference to FIG. 12, the sum of the differences of the pixels' values in the target window between the current frame and the frame at the end of part three is computed, i.e., before detecting the baseball 112 close to the target 115. FIGS. 19 and 20 depict the difference between two consecutive frames of all pixels within a target 115. Referring to FIG. 19, where the baseball 112, which is represented as the white colored circle on the rectangular black background, has yet to contact the target 112 only pixels that correspond to the moving baseball 112 have changed. As shown in FIG. 20, once a baseball 112 has made impact with a target 115, most of its pixels are moved.

Next, the number and areas of connected components in the image that are difference is detected. Suitably, if the difference is caused by a moving baseball 112 only, only one or a few connected components with small areas should be realized. On the other hand, major target deformation typically results in a large number of connected components or few components with very large areas. Thus, the algorithm will decide that a baseball 112 has hit a target 115 if the sum of differences exceeds a threshold, e.g., the number of connected components is more than three or the sum of the areas of the connected components exceeds a predetermined threshold. The result is detecting the contacted zone.

Baseball Hits the Target Frame

If a baseball's 112 initial travel path reverses direction, the system 100 suitably detects the instance the baseball 112 bounces off the frame 116 traveling in a direction opposite the initial travel path. Such pitch is recorded as an invalid pitch.

Baseball Travels in Front of the Target and Misses the Target

If a baseball 112 is detected as having traveled past a target 115 without contacting either the target 115 or the frame 116, the pitched baseball 112 is recorded as an invalid pitch.

Baseball Misses the Target Disappearing Undetected

If a baseball 112 cannot be detected in several consecutive frames, it is assumed that the baseball 112 has disappeared behind the target 115 and the pitch is recorded as an invalid pitch.

Figure 21:
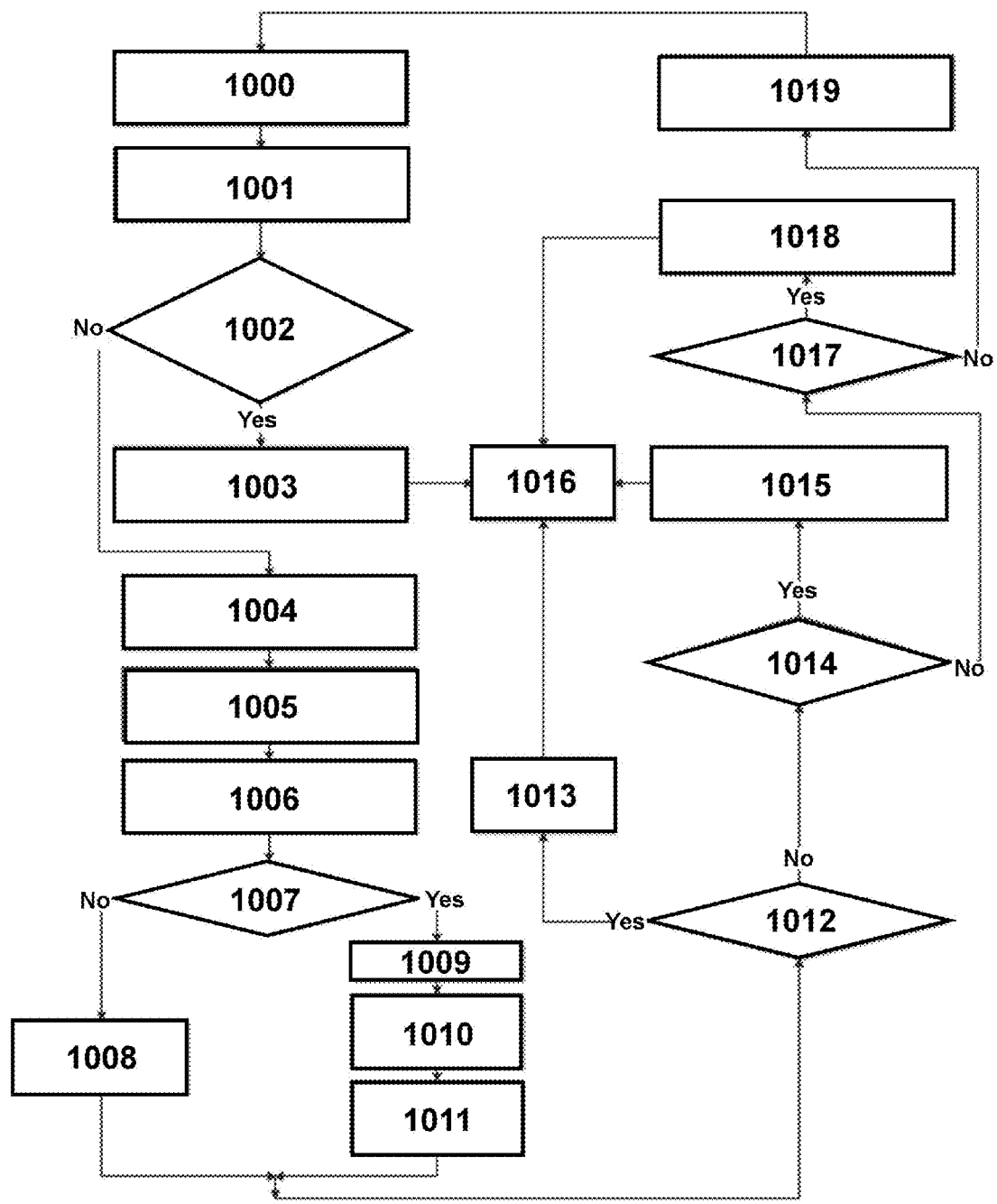
FIG. 21 is a flowchart of an algorithm developed to analyze motion and position of a baseball in flight as the baseball approaches a target.

A detailed flowchart of an algorithm developed to analyze motion and position of a baseball 112 as it approaches a target 115 in regard to the above scenarios is provided in FIG. 21. Table 1 below includes details related to the flowchart of FIG. 21.

TABLE 1

| | |
|---|---|
| 1000 | Calculate the difference within the Target 115 window between current frame and first frame |
| 1001 | Identify the pixels that moved within the target and regroup them as connected components (cc) |
| 1002 | Is the difference >= Th1 or N° (cc) >= 3 or Σareas (cc) >= Th2? |
| 1003 | Baseball hit the Target 115, use previous baseball 112 location to identify the hit zone |
| 1004 | Predict next position using Kalman filter |
| 1005 | Get baseball 112 location using background difference |
| 1006 | N° frames baseball 112 undetected = 0 |
| 1007 | Is the baseball 112 detected? |
| 1008 | Increment N° frames baseball 112 undetected |
| 1009 | Save baseball 112 location |
| 1010 | N° frames baseball 112 undetected = 0 |
| 1011 | Update Kalman filter parameters |
| 1012 | If the baseball 112 moved backward in opposite direction |
| 1013 | Invalid Pitch; the baseball 112 hit the frame 116 |
| 1014 | Is N° frames baseball 112 undetected >= Th3? |
| 1015 | Invalid Pitch; the baseball 112 disappeared behind the target 115 |
| 1016 | Wait for the beginning of the next pitch |
| 1017 | Is the baseball 112 no longer in the target window? |
| 1018 | Invalid pitch; the baseball 112 missed the target 115 |
| 1019 | The baseball 112 is still in its travel path, continue with baseball 112 tracking in the next frame |

Velocity Estimation

To compute the velocity or speed of a traveling object such as a baseball 112, two parameters are suitably identified: (1) the distance traveled by the baseball 112 in a fixed number of frames and (2) the temporal resolution of the video recording, i.e., the number of frames per second. As understood by the skilled artisan, the latter of the two may be extracted from the video header and is typically about 240 frames per second. The number of pixels traveled by an object such as a baseball 112 may be computed using the position of the baseball 112 detected at each frame.

In order to convert the distance from pixels to physical or actual distance, the spatial resolution of the pixels is identified. Any conversion performed is suitably accurate as a small deviation may cause a large error in the estimated speed of a pitched baseball 112. In addition, because a baseball 112 has a fixed size and due to the position of the image capturing system 117 (see FIG. 1), the resolution decreases as the baseball 112 travels toward a target 115. In other words, as a baseball 112 travels toward a target 115 the size of the baseball 112 decreases gradually indicating a decrease in the spatial resolution.

Figure 22:
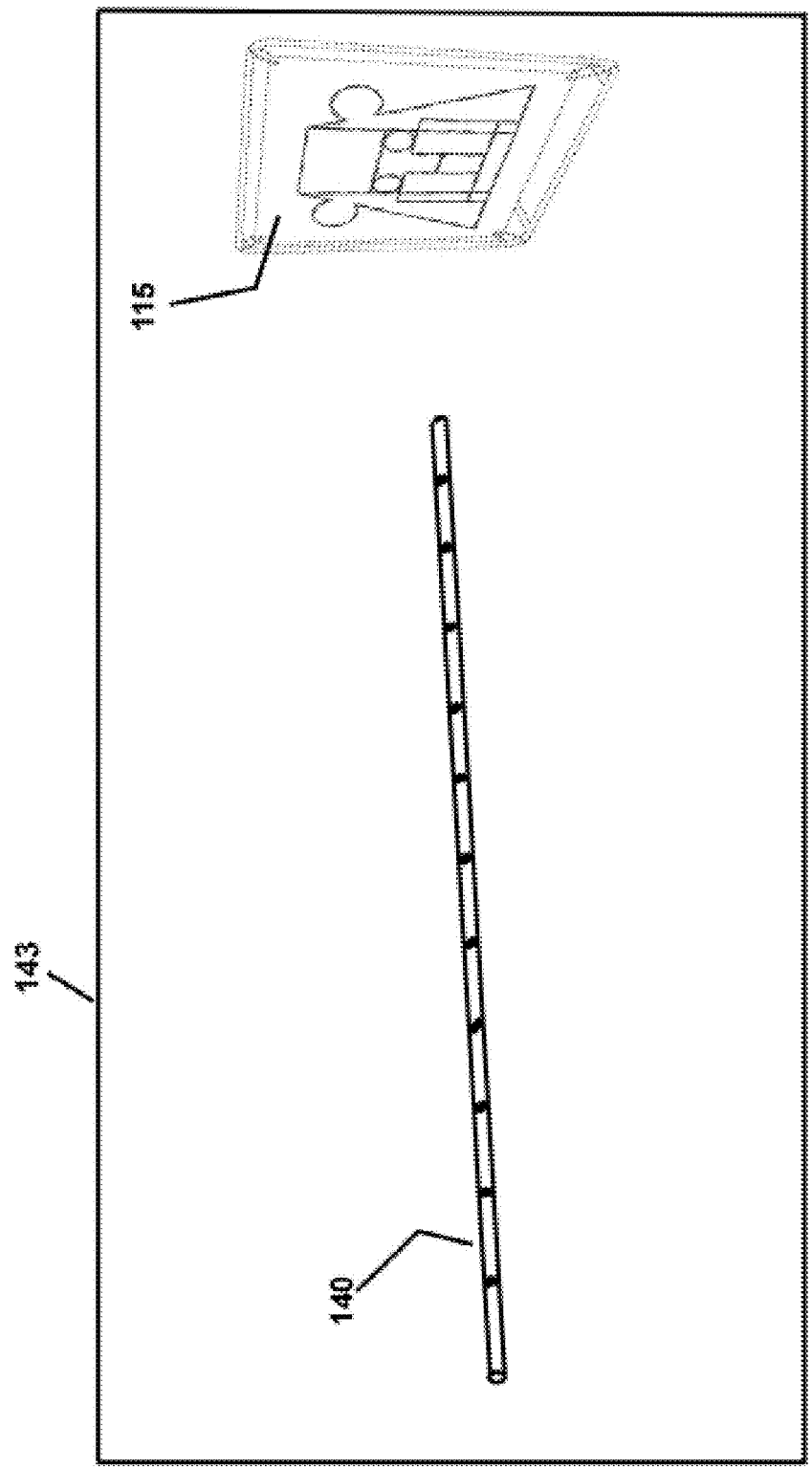
FIG. 22 is a simplified view of a pitching throwing target and a marker stick of the present application.

In one mode of system 100 operation, it is assumed that the position and angle of the image capturing system 117 is fixed and a calibration step is performed. One suitable calibration step may include setting up an image capturing system 117 in relation to a target 115 as shown in FIG. 1. As shown in FIG. 22, a marker stick 140 may be located in the background behind the field of travel of the baseball 112 toward the target 115. Without limiting the invention, a suitable marker stick 140 may include a stick, pipe, rope, cable or other elongated device having distinct marks disposed on the surface of the marker stick 140. In one suitable embodiment, the marker stick 140 may include a length equivalent to the travel range 99 with equidistant marks establishing sections, each mark being set apart about 0.30 meters (1.0 feet). In one embodiment, the marker stick 140 may be set on the ground 123. In another embodiment, the marker stick 140 may be elevated above the ground 123, floor or other support surface via one or more supports, e.g., chairs, sawhorses, bricks, as desired. Other modes of measurement may be employed as desired according to one or more other background settings.

Figure 23:
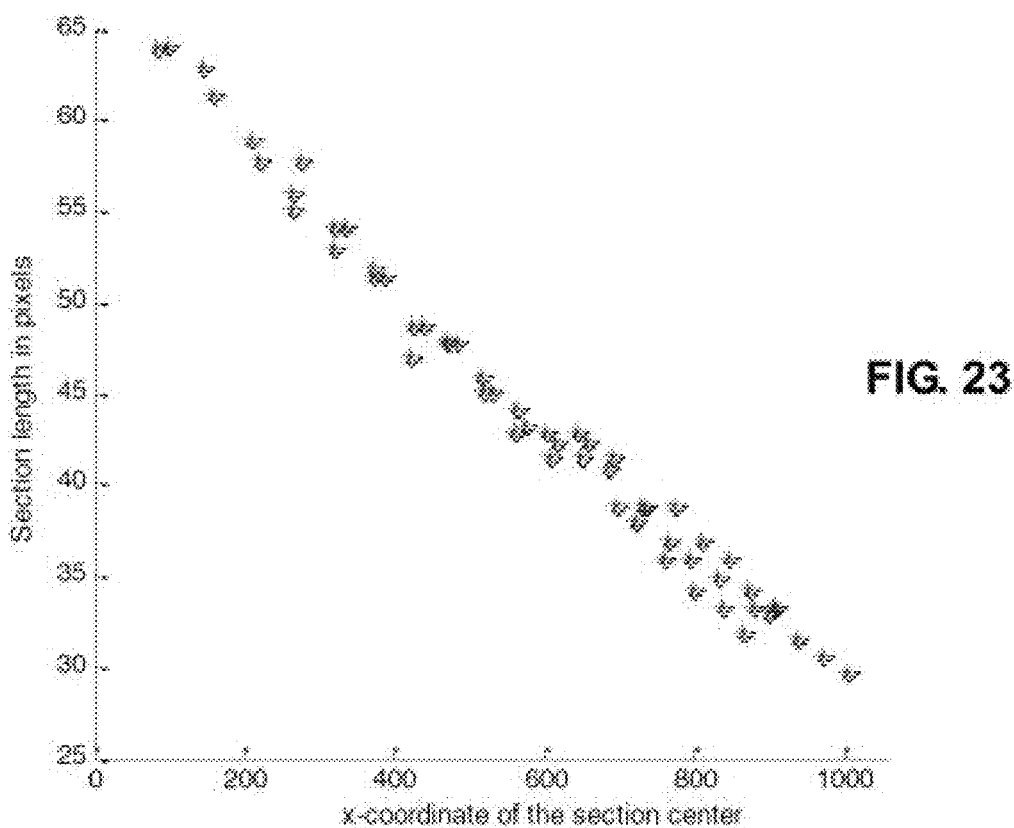
FIG. 23 is a graph exemplifying the length in pixels of one foot sections of a marker stick versus its distance at the center of each section in pixels from the left edge of the image frame of FIG. 22.
Figure 24:
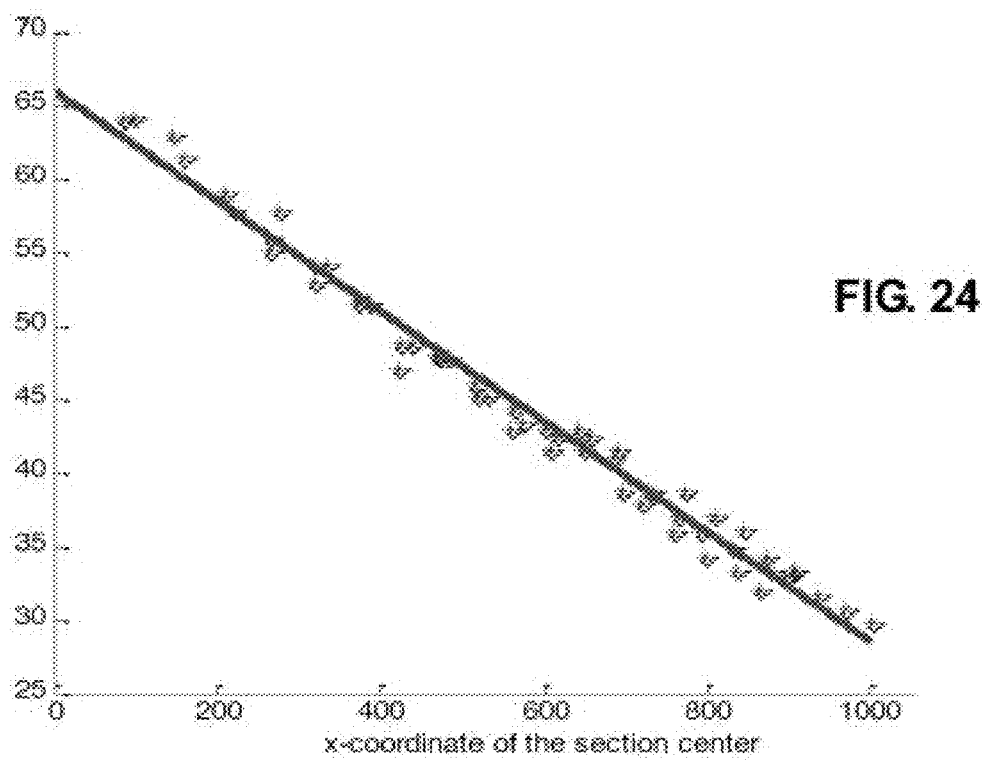
FIG. 24 is a graph illustrating the linear regression model of the decrease in resolution of FIG. 23 for estimating dynamic pixel resolution at any location with the image frame of FIG. 22.

Once the marker stick 140 is positioned as desired, multiple videos may be made to measure the length in pixels of each section of the marker stick 140 in individual image frames 143. Once measured, the length may be plotted versus the distance of the one foot sections centers from the left edge of the frame, hereafter referred to as the x-coordinate of the section center. FIG. 23 depicts exemplary collected length measurements. As shown, the resolution decreases, meaning each one foot section appears shorter from left to right, i.e., the x-coordinate increases. In addition the decrease in resolution fits a linear pattern. This pattern may be characterized by fitting a linear regression model to estimate the dynamic pixel resolution at any location within the frame (see FIG. 24).

Once calibrated, the first N frames (typically N=10) after the baseball 112 appears on the travel range 99 are used. For each frame, the distance traveled in pixels is computed and converted to actual distance using the learned regression model and the position of the first baseball 112 to map from foot length to number of pixels. The sum of all N distances is then converted to velocity or speed using the temporal resolution (frames/sec) of the video recording.

Vertical Displacement

Figure 25:
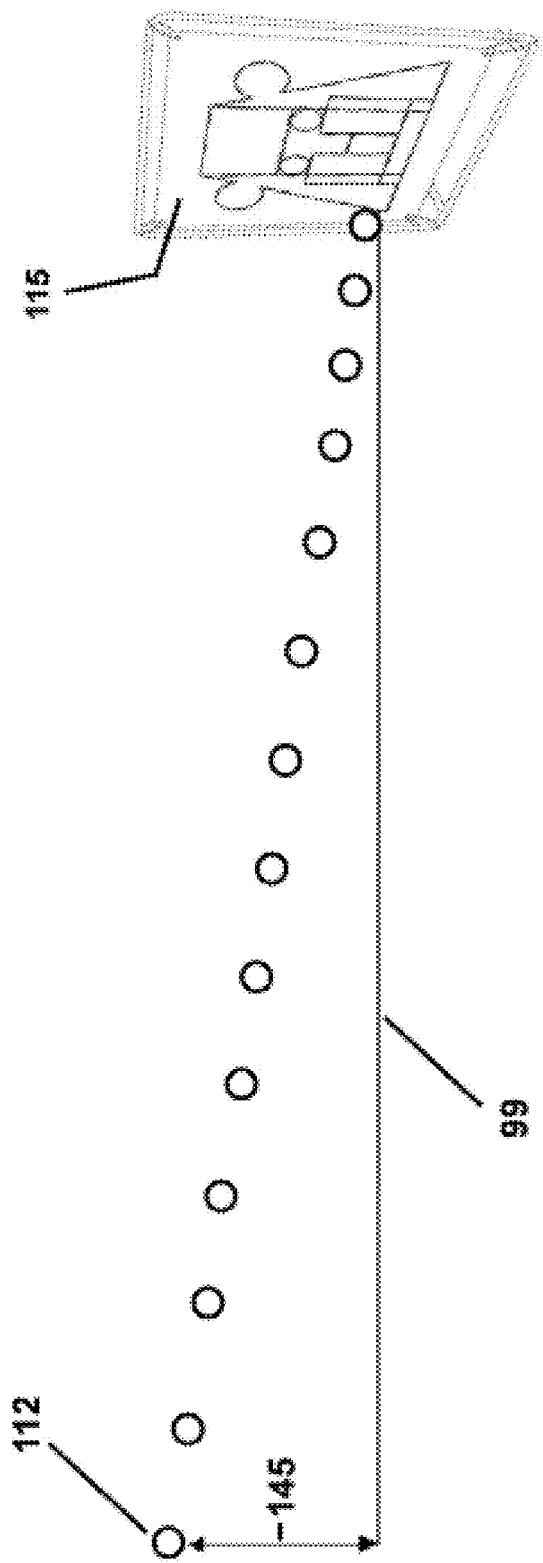
FIG. 25 is a simplified illustration of a target and path of a thrown baseball pitch depicting the vertical displacement of the pitch.

Vertical displacement involves the difference of the vertical position of an object such as a baseball 112 between its first appearance in the travel range 99 of the object and at impact with a target 115 or other desired location in space. Similar as described above in relation to velocity estimation, the vertical displacement of a baseball 112 may be calculated in the number of pixels between the highest and the lowest position and converted into meters. Using the marker stick 140, the vertical resolution, i.e., the number of pixels per foot, is substantially the same for each section of the marker stick 140. A mapping constant (about sixty (60) pixels per foot) is extracted from one section of the marker stick 140 and used to calculate the vertical displacement. For example, see the simplified illustration of FIG. 25 depicting calculated vertical displacement 145 showing the highest and lowest positions of the baseball 112.

Implementation of a Virtual Target

In another embodiment, a physical target 115 may be replaced with a person such as a hind catcher 155 and a virtual or phantom target 115 used in place of a physical target 115. In this embodiment, the system 100 suitably provides the estimated location of distinct zones of a particular target 115 layout and the location that individual pitches contact particular zones according to the layout of the virtual or phantom target 115.

As understood by the skilled artisan, the absence of a physical target 115 means that the perturbation of the physical target 115 cannot be employed. As a result, a different method is used to track the baseball 112 in flight when employing a virtual target 115. In one embodiment employing 2-D imaging, to establish the location and layout of a virtual target 115 a physical target 115 is first set in a desired position at or near an intended location, e.g., the location of a hind catcher's glove or mitt when receiving pitches. The computer vision system suitably records several frames of the physical target 115 prior to replacing the target 115 with a hind catcher 155. These initial frames are used to recognize the target 115 from a plurality of target templates of the system 100 and record the border 150 of a target 115 or its surrounding target surface 113, which is shown as rectangular in shape in FIG. 26.

Figure 26:
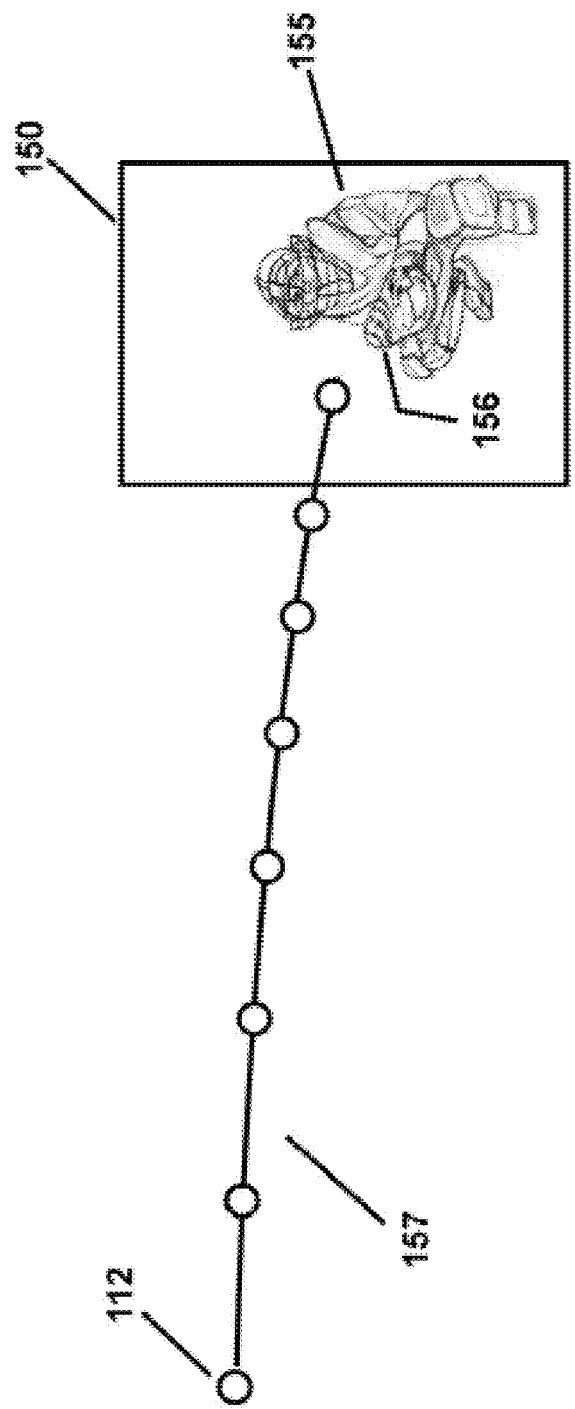
FIG. 26 is a simplified depiction of a hind catcher and a virtual border of a target's perimeter surface provided as part of the present system for use of a virtual target.

With further reference to FIG. 26, which displays the path 157 of a pitched baseball 112 until it is caught by a hind catcher 155, a template image of the baseball 112 as it first appears in view of the image capturing system 117 is saved to the computer vision system. As the baseball 112 travels closer to the hind catcher 155 a multi-scale template matching algorithm is applied using the saved baseball 112 patch as a template to locate the next position of the baseball 112. In every frame, the scores obtained from template matching are thresholded to detect if the baseball 112 has disappeared and if it was caught by the hind catcher 155 (or "catcher 155"). The distance traveled by the baseball 112 is also checked to determine if the distance is less than half the distance it traveled in the previous frame. This last step may be required in cases where the baseball 112 is caught but remains visible.

Figure 27:
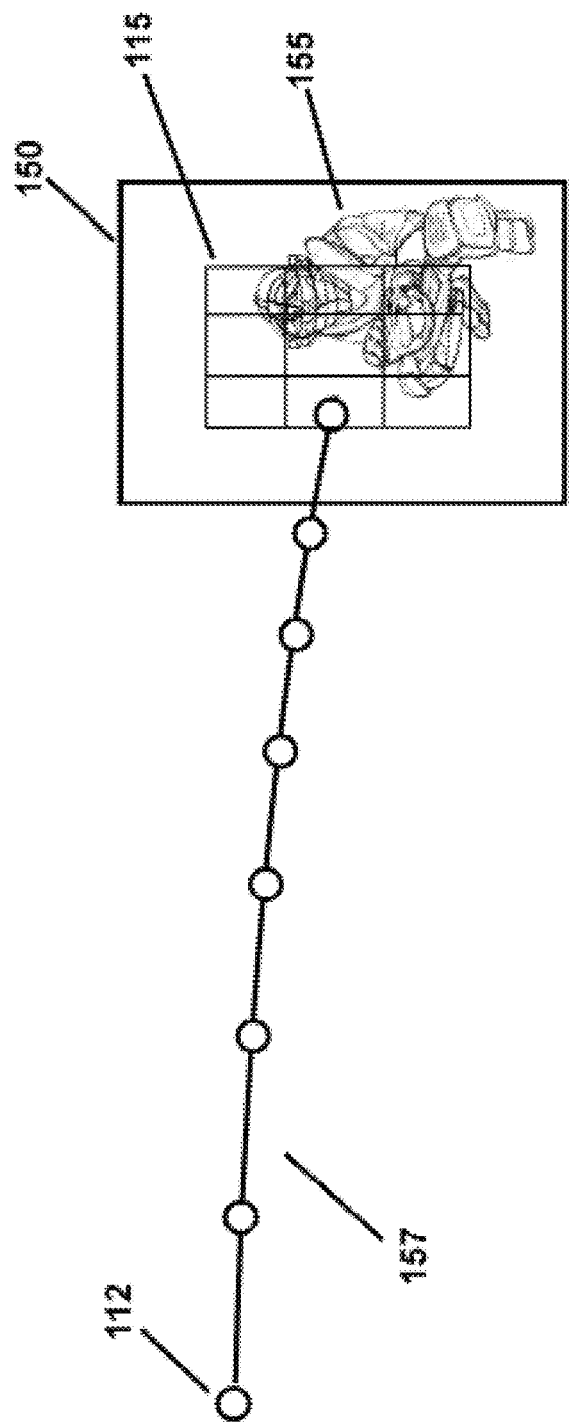
FIG. 27 is the image of FIG. 26 including a virtual target superimposed in front of the hind catcher to identify the location a pitched baseball hits the virtual target.

As the baseball 112 is caught by the catcher 155, the location where the baseball 112 stops moving is recorded. Also, the system 100 suitably superimposes the previously identified physical target 115 to its original position within the border 150 as a virtual target 115 providing the location, e.g., zone 102, on the target 115 where the baseball 112 traveled (see FIG. 27).

In order to video record a baseball 112 as described above, the image capturing system 117 may be located at an angle as shown in FIG. 1 or at a different angle as may be required according to the location of system 100 operation, e.g., due to limited space, an uneven surface of the ground 123. In another embodiment, the system 100 may include an image capturing system 117 located behind a catcher 155 alone or in addition to a first image capturing system 117 as shown in FIG. 1. In one embodiment, the back surface of the target 115 may include the outlay of distinct zones viewable in an opposite configuration compared to the outlay as viewed from the front surface 113 as described above. In baseball game situations, an image capturing system 117 may be located behind a backstop in the available seating area or from an elevated position behind a catcher in the seats or press box type location as understood by persons of ordinary skill in the art of baseball. In such embodiment, the system 100 is operationally configured to view and record delivered pitches to a virtual target 115 according to the target outlay on the back surface of the target 115. Herein, such feature may be referred to as "dual surface imaging."

In still another embodiment, 3-D imaging may be implemented via the addition of one or more image capturing systems 129 (see FIG. 11) at one or more second locations, the image capturing systems and a home plate 122, or other visual marker, being effective to establish the location and layout of a predetermined virtual target 115 layout at a desired location without the need of a physical target 115.

Target Zone Identification

Figure 28:
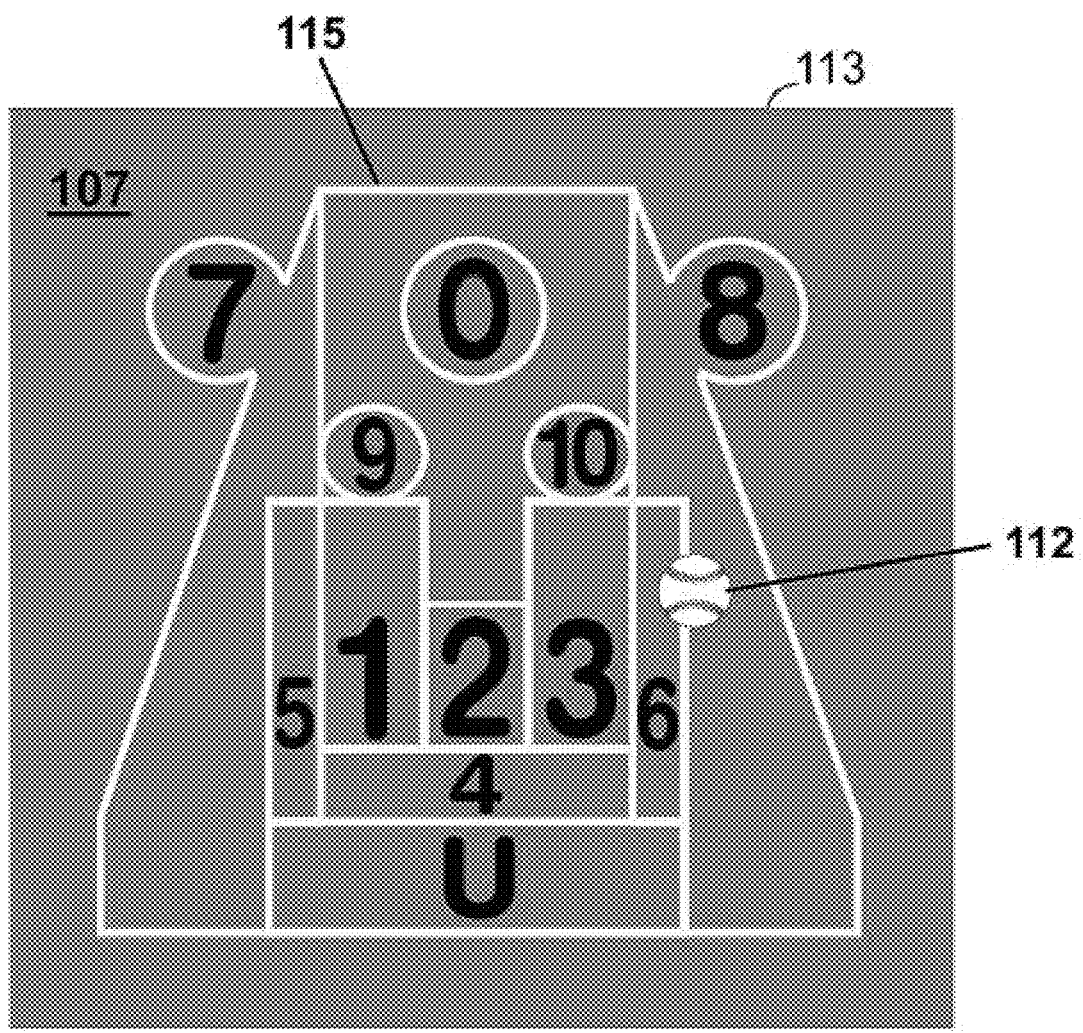
FIG. 28 is a front view of an exemplary target of the system of the application including a baseball making contact with the target in multiple zones.

As discussed above, as a baseball 112 hits a target 115 the software of the present computer vision system suitably detects the zone that each pitched baseball 112 contacts. Because zone dividers may include narrow lines compared to the diameter of the baseball 112, a baseball 112 may actually contact more than one zone. As such, the computer vision system is operationally configured to report three zones that have the highest percentages of pixels from the baseball 112. For evaluation purposes, an additional constraint is employed whereby the reported percentages in one particular zone have to be higher than 30.0% to report that zone as being hit or contacted by a pitched baseball 112. With attention to FIG. 28, in a simplified example where a pitched baseball 112 hits the border between zones 6 and 8, the system 100 software is operationally configured to calculate the percentage of coverage of the baseball 112 in each of the two zones. In a simplified example, where a baseball 112 contacts a target 115 as shown in FIG. 28, the system 100 software may report zone 8 as the hit zone of the pitch based on a calculation that 63.0% of the baseball 112 contacted zone 8 whereas 36.0% of the baseball 112 contacted zone 6. It is further contemplated that a baseball 112 may contact three or more zones, the software being operationally configured to calculate the percentage of coverage of the baseball 112 on each of the contacted zones, e.g., a baseball 112 contacting zones 3, 6, 8 and 10 in FIG. 28.

Operation of the computer vision system described herein may be implemented in digital electronic circuitry, or in computer software, firmware, or hardware, including the structures disclosed in this specification and their structural equivalents, or in combinations of one or more of them. Examples of the subject matter described herein can be implemented as one or more computer programs, i.e., one or more modules of computer program instructions, encoded on a non-transitory computer-readable storage medium for execution by, or to control the operation of, data processing apparatus. The program instructions may be encoded on an artificially generated propagated signal, e.g., a machine-generated electrical, optical, or electromagnetic signal, which is generated to encode information for transmission to one or more receiver devices for execution by a processor or data processing apparatus, e.g., a 3:5 GHz 6-core processor or equivalent. A computer storage medium may be included in a computer-readable storage device, a computer-readable storage substrate, a random or serial access memory array or device, or a combination of one or more of each. In addition, a computer storage medium may be a source or destination of computer program instructions encoded in an artificially generated propagated signal. Computer storage medium may also be included in one or more separate physical components or media (e.g., multiple CDs, disks, or other storage devices).

The operations of the present system 100 may be implemented as operations performed by a processor or data processing apparatus on data stored on one or more computer-readable storage devices or received from other sources. The term "processor" or "data processing apparatus" or "computing device" may include various apparatuses, devices, and machines for processing data, including, but not necessarily limited to a programmable processor, a computer, a system on a chip, or multiple ones, and combinations thereof. An apparatus of the system 100 may include special purpose logic circuitry, e.g., an FPGA (field programmable gate array) or an ASIC (application specific integrated circuit). A suitable apparatus may also include, in addition to hardware, code that creates an execution environment for a computer program, e.g., code that constitutes processor firmware, a protocol stack, a database management system, an operating system, a cross-platform runtime environment, a virtual machine, or a combination of one or more of them.

A computer program, i.e., a program, software, software application, script, application or code, of the present system 100 may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network such as a cloud 130.

The processes and logic flows of this application may be performed by one or more programmable processors executing one or more computer programs to perform actions by operating on input data and generating output. The processes and logic flows may also be performed by, and apparatuses may also be implemented as, special purpose logic circuitry, e.g., an FPGA (field programmable gate array) or an ASIC (application specific integrated circuit).

System 100 processors suitable for the execution of a computer program may include both general and special purpose microprocessors and any one or more processors of any kind of digital computer. As understood by the skilled artisan, a processor receives instructions and data from a read only memory or a random access memory or both. The essential elements of a computer are a processor for performing actions in accordance with instructions and one or more memory devices for storing instructions and data. As also understood by the skilled artisan, a computer may include, or be operatively coupled to receive data from or transfer data to, or both, one or more mass storage devices for storing data, e.g., magnetic, magneto optical disks, or optical disks. However, a computer need not have such devices. A computer may be embedded in a device such as a laptop computer, tablet computer, smartphone 125, digital camera, a mobile telephone other than a smartphone 125, a personal digital assistant ("PDA"), a mobile audio or video player, a game console, a Global Positioning System ("GPS") receiver, or a portable storage device, e.g., a universal serial bus (USB) flash drive. Devices suitable for storing computer program instructions and data may include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory of the system 100 may be supplemented by, or incorporated in, special purpose logic circuitry.

To provide for user interaction, examples of the subject matter described herein may be implemented on a computer having a display device, e.g., a CRT (cathode ray tube), plasma, or liquid crystal display ("LCD") monitor, for displaying information to a user and a keyboard and/or a pointing device, e.g., a mouse, touch screen or a trackball, by which a user may provide input to the computer. Other devices may be used to provide for user interaction. For example, feedback provided to a user may be any form of sensory feedback, e.g., visual feedback, auditory feedback, or tactile feedback and input from a user may be received in any form, including acoustic, speech, or tactile input. In addition, a computer may interact with a user by sending information to and receiving information from a device that is used by a user, for example, sending information to a web browser on a user's client device.

Examples of the subject matter described herein may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described herein, or any combination of one or more such back end, middleware, or front end components. The components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The system 100 may also include clients and servers. A client and server are generally remote from each other and typically interact through a communication network such as a cloud 130. The relationship of client and server arises by virtue of computer programs running on the respective computers and having a client-server relationship to each other. In some examples, a server transmits data to a client device (e.g., for purposes of displaying data to and receiving user input from a user interacting with the client device). Data generated at the client device (e.g., a result of the user interaction) may be received from the client device at the server.

The invention will be better understood with reference to the following non-limiting example, which is illustrative only and not intended to limit the present invention to a particular embodiment.

EXAMPLE 1

In a first non-limiting example, the system 100 is operationally configured to provide the vertical displacement 145 of a pitched baseball 112 as shown in the simplified illustration of FIG. 25. For one particular pitch delivered to a target 115 set about 18.9 meters (62.0 feet) from a pitcher's rubber, the vertical displacement 145 recorded is about 0.58 meters (1.93 feet).

Persons of ordinary skill in the art will recognize that many modifications may be made to the present application without departing from the spirit and scope of the invention. The embodiment(s) described herein are meant to be illustrative only and should not be taken as limiting the invention, which is defined in the claims.

I claim:
1. A system, including:
   one or more separate physical target surfaces, each target surface having a distinct target including an outlay of distinct zones thereon;
   one or more objects to be directed toward the targets located on the one or more separate physical target surfaces; and
   a computer vision system operationally configured to receive input pertaining to the outlay of one or more particular recognized targets on the one or more separate physical target surfaces provided for use; receive input pertaining to one or more locations on one or more of the particular targets intended to be contacted by one or more objects; receive input providing motion information for one or more objects directed toward one or more targets; receive input providing the location that each of the one or more objects contacts a particular target surface; compute said received input to provide information related to accuracy, object velocity, object travel path, object vertical displacement, and combinations thereof.

2. The system of claim 1 wherein the computer vision system employs vision algorithms for identifying the outlay of distinct zones on the one or more separate physical target surfaces.

3. The system of claim 1 wherein the computer vision system employs vision algorithms to cluster different pixels of distinct zones on the one or more separate physical target surfaces according to color distributions of the distinct zones.

4. The system of claim 1 wherein the one or more objects contacting the one or more separate physical target surfaces are one or more pitched baseballs and the computer vision system employs vision algorithms for collecting pitching data including intended pitch location of individual pitches, actual pitch location realized for individual pitches, the velocity of individual pitched baseballs, and the vertical displacement of individual pitches.

5. The system of claim 4 wherein the pitching data collected provides information in regard to pitching accuracy for developing control, developing command and optimizing pitch location and pitch type for a series of pitches.

6. A system, including:
a plurality of separate physical target surfaces, each target surface including a target thereon, each target having a distinct target outlay of individual zones;
one or more baseballs to be directed toward the targets located on the plurality of separate physical target surfaces; and
a computer vision system operationally configured to receive input pertaining to recognized individual zones of a target outlay on a particular physical target surface provided for use from the plurality of separate physical target surfaces; collect and store pitching data concerning the target outlay including, intended pitch location, actual pitch location realized, the velocity of individual pitched baseballs and the vertical displacement of individual pitched baseballs, wherein the data stored is retrievable electronically by one or more persons.

7. The system of claim 6 wherein the computer vision system employs vision algorithms operationally configured to accumulate contact location data of individual pitched baseballs along a recognized target in relation to the individual zones of its target outlay based on the intended pitch contact location along the target of individual pitched baseballs and the actual pitch contact location of individual pitched baseballs.

8. The system of claim 6 wherein the computer vision system employs vision algorithms operationally configured to identify a phantom target outlay in space corresponding to the target outlay of a recognized target of a particular physical target surface when the physical target surface is removed from use and identify the contact location of pitched baseballs along the phantom target outlay.

9. The system of claim 8 wherein the computer vision system is operationally configured to change from a first phantom target outlay in space to a second phantom target outlay in space for a particular individual using the system, the second phantom target outlay corresponding to a second recognized target.

10. The system of claim 6 wherein the individual zones include colored zones and wherein the computer vision system employs vision algorithms operationally configured to cluster different pixels of one or more individual zones according to color distribution of the individual zones in a manner effective to record actual location data of where individual pitched baseballs contact the target.

11. The system of claim 6 including a video camera operationally configured to record motion of a pitched baseball in space.

12. The system of claim 6 including a smartphone having a video camera and a computer vision application operationally configured to record in real time a model of an individual pitcher's delivery, intended location of pitched baseballs, realized location of pitched baseballs, intended velocity of pitched baseballs, measured velocity of pitched baseballs, and vertical movement of pitched baseballs in space.

13. A method for developing baseball pitching including:
providing a system including a plurality of separate physical targets from which an individual can select one or more particular physical targets for use, each separate physical target including a target surface for receiving thrown baseballs there against with a distinct target outlay of distinct zones on the target surface; one or more baseballs to be thrown toward the plurality of separate physical targets; and a computer vision system including at least one video camera, the computer vision system being operationally configured to recognize a particular physical target selected for use amongst a plurality of stored target templates using vision algorithms to detect distinct zones of a particular target outlay and to record and store pitching information for one or more individual pitchers using one or more of the particular physical targets;
as an individual performs the act of baseball pitching by throwing one or more baseballs toward a recognized physical target, the computer vision system is programmed to (1) record the intended location of one or more individual pitched baseballs in or around one or more particular zones on its target surface, (2) record the actual location that the one or more pitched baseballs contact the target surface, (3) provide computational information regarding the accuracy of pitched baseballs thrown according to the intended location and actual location of contact of each pitched baseball along the target surface and (4) provide a database related to pitcher performance according to information collected and stored by the system.

14. The method of claim 13 wherein the computer vision system is programmed to record an intended type of pitch to be thrown, record the intended velocity for a particular type of pitch and record the actual velocity of individual thrown baseballs.

15. The method of claim 13 wherein a particular physical target selected for use may be removed and replaced with an individual including a hind catcher, the computer vision system being programmed to provide a virtual target in the location where the physical target was target was recognized for use in place of the removed physical target.

16. The method of claim 13 wherein the baseball pitching may be observed in real time by one or more persons at one or more remote locations.

\* \* \* \* \*